US007949731B2

(12) United States Patent
Nakamura et al.

(10) Patent No.: US 7,949,731 B2
(45) Date of Patent: May 24, 2011

(54) COMMUNICATION APPARATUS, COMMUNICATION CONTROL METHOD, AND PROGRAM FOR READING COMMUNICATION CONTROL INFORMATION FOR REMOVABLE STORAGE MEDIA

(75) Inventors: Hitoshi Nakamura, Tokyo (JP); Satoshi Miki, Tokyo (JP)

(73) Assignee: Sony Corporation, Tokyo (JP)

( * ) Notice: Subject to any disclaimer, the term of this patent is extended or adjusted under 35 U.S.C. 154(b) by 1073 days.

(21) Appl. No.: 10/493,859

(22) PCT Filed: Aug. 20, 2003

(86) PCT No.: PCT/JP03/10484
§ 371 (c)(1),
(2), (4) Date: Apr. 27, 2004

(87) PCT Pub. No.: WO2004/021642
PCT Pub. Date: Mar. 11, 2004

(65) Prior Publication Data
US 2005/0043019 A1      Feb. 24, 2005

(30) Foreign Application Priority Data

Aug. 29, 2002   (JP) ............................... P2002-250518

(51) Int. Cl.
*G06F 17/00* (2006.01)
*G06F 15/16* (2006.01)
(52) U.S. Cl. ......... 709/220; 709/226; 709/227; 709/223
(58) Field of Classification Search .................. 713/1, 2, 713/100; 709/220–222
See application file for complete search history.

(56) References Cited

U.S. PATENT DOCUMENTS

| 5,999,207 | A  | * | 12/1999 | Rodriguez et al. | ......... 348/14.03 |
| 6,160,796 | A  | * | 12/2000 | Zou              | ............... 370/257 |
| 6,161,176 | A  | * | 12/2000 | Hunter et al.    | .................... 713/1 |
| 6,421,793 | B1 | * | 7/2002  | Lester et al.    | .................... 714/37 |
| 6,466,981 | B1 | * | 10/2002 | Levy             | ............... 709/227 |
| 6,934,853 | B2 | * | 8/2005  | Christopherson et al. | ........ 726/6 |
| 7,152,099 | B1 | * | 12/2006 | Arens            | ............... 709/220 |
| 2003/0005100 | A1 | * | 1/2003 | Barnard et al. | ............... 709/223 |

(Continued)

FOREIGN PATENT DOCUMENTS
JP          6 22054          1/1994

(Continued)

OTHER PUBLICATIONS

Network set up of Windows 2000, Let's get started by TCP/IP, Japan, ASCII Corporation, Dec. 31, 2000, p. 81-83.

*Primary Examiner* — Jeffrey Pwu
*Assistant Examiner* — Sulaiman Nooristany
(74) *Attorney, Agent, or Firm* — Frommer Lawrence & Haug LLP; William S. Frommer; Thomas F. Presson

(57) ABSTRACT

The present invention relates to a communication apparatus, communication control method and program adapted for carrying out wireless LAN communications without imposing a troublesome feeling upon the user. A television receiver carries out communications with another apparatus through a predetermined network. Meanwhile, the television receiver, when inserted by a memory card 13 in its card slot 10, reads wireless LAN information out of the memory card 13 and sets the wireless LAN information to the television receiver. The present invention is applicable to a television receiver or the like having a wireless LAN function, for example.

15 Claims, 13 Drawing Sheets

U.S. PATENT DOCUMENTS

2003/0142215 A1* 7/2003 Ward et al. ............... 348/207.1
2003/0204748 A1* 10/2003 Chiu ............................ 713/201
2004/0030923 A1* 2/2004 Tindal et al. ................ 713/201

FOREIGN PATENT DOCUMENTS

| | | |
|---|---|---|
| JP | 11 98196 | 4/1999 |
| JP | 2000 22732 | 1/2000 |
| JP | 2000 49687 | 2/2000 |
| JP | 2001 144812 | 5/2001 |
| JP | 2001 189722 | 7/2001 |
| JP | 2001 274816 | 10/2001 |
| JP | 2001-282747 | 10/2001 |
| JP | 2003 304258 | 10/2003 |

* cited by examiner

FIG. 4

"WirelessConfig.txt" FILE

[CONTENT] WIRELESS LAN SET INFORMATION (1) SSID (NETWORK NAME) :
    xxxx
(2) OPERATION MODE :
    Infrastructure/peer-to-peer
(3) ENCRYPTION KEY :
    EFFECTIVE/INEFFECTIVE
    KEY LENGTH
    INPUT KEY • MODE ASCII/hexadecimal number
    KEY ************

COMMUNICATION APPARATUS, COMMUNICATION CONTROL METHOD, AND PROGRAM FOR READING COMMUNICATION CONTROL INFORMATION FOR REMOVABLE STORAGE MEDIA

TECHNICAL FIELD

The present invention relates to a communication apparatus, communication control method and program, and more particularly to a communication apparatus, communication control method and program for implementing communications without imposing a troublesome feeling upon the user.

BACKGROUND ART

Recently, it is becoming a general practice for the household to have an access at between information processing apparatuses, such as personal computers, through the use of a wireless LAN (Local Area Network).

In response, there is a trend toward developing a television receiver having an apparatus with the existing wireless LAN technology, to receive, reproduce and display a multimedia content provided by the Web or the like through a network.

In the meanwhile, at present, although there is somewhat disparity between countries, the wireless LAN ratings in general employment in the households centered on Japan and United States are defined under IEEE802.11b (see IEEE STD802.11b-1999 Part11: Wireless LAN Medium Access Control (MAC) and Physical Layer (PHY) specifications: Higher-Speed Physical Layer Extension in the 2.4 GHz Band) as a radio transmission over 2.4 GHz band in conformity to IEEE802.11 (see IEEE STD802.11-1997 Part11: Wireless LAN Medium Access Control (MAC) and Physical Layer (PHY) specifications), IEEE802.11g (see IEEE STD802.11g-2001 Draft) or IEEE802.11a (see IEEE STD802.11a-1999 Part11: Wireless LAN Medium Access Control (MAC) and Physical Layer (PHY) specifications: Higher-Speed Physical Layer in the 5 GHz Band) as a radio transmission over 5 GHz band.

Under these ratings, the same bit string called SSID (Service Set Identification) is necessarily inputted to the apparatuses in order to wireless-connect the apparatuses within the same network. Namely, SSID is the information for identifying a wireless network. The apparatuses, belonging to the same wireless network, are necessarily set with the same SSID.

Meanwhile, the business organization WECA (Wireless Ethernet(R) Compatibility Alliance) recommends to get a WiFi (Wireless Fidelity) qualification that assures the compatibility of between the wireless communication apparatuses of the makers for implementing wireless LAN communications conforming to the wireless LAN rating. For obtaining the WiFi qualification, it is presently requisite to employ a WEP (Wired Equivalent Privacy) protocol as a protocol to encrypt the communication data of between the wireless communication apparatuses within the network.

WEP-based encryption, despite its weakness is pointed out, is generally recognized necessary in providing a minimal level of security. For implementing communications with WEP encryption, there is a need to register a bit string called a WEP key having 40 or 128 bits commonly to the wireless communication apparatuses. Namely, for employing a cipher protocol and implementing wireless communications between wireless communication apparatus, there is a need to configure the same encryption key.

Herein, in the traditional wireless communication apparatus, generally an SSID or encryption key is generated from a character string or numeral string inputted by the user.

Meanwhile, of the wireless communication apparatuses for carrying out wireless LAN communications, there is a wireless communication apparatus serving as a radio repeater called an access point. In the repeater, the user is required to select and set an operation mode called Ad-hoc for LAN-connecting peer-to-peer between two wireless communication apparatuses and an operation mode called Infrastructure for LAN-connecting between a plurality (two or more) wireless communication apparatuses, in accordance with use situation.

Accordingly, in the case of architecting a wireless LAN network by the use of wireless communication apparatuses, the user is required to input an SSID, encryption key and operation mode.

Incidentally, where IP (Internet Protocol) is employed as a communication protocol, in order to participate in a network, there is a need to set a unique IP address existing within the same sub-net mask as of the apparatus already participated in the network. However, recently, concerning IP address setting, there has been developed and spread a contrivance, called DHCP (Dynamic Host Configuration Protocol), AutoIP, UPnP (Universal Plug and Play), etc., capable of automatically setting IP addresses, eliminating the necessity of user's setting.

As noted above, for causing the radio communication apparatus to access a wireless LAN, the user is required to input an SSID, encryption key and operation mode.

Accordingly, even where the wireless communication apparatus as a television receiver incorporating a wireless LAN function is caused to access a wireless LAN network already architected, there is a necessity for the user to examine a character or numerical string for generating an SSID or encryption key set over the to-be-accessed wireless LAN network. The same character or numerical string must be input to and set up on the television receiver, posing a problem of inflicting a troublesomeness feeling upon the user.

Furthermore, the television receiver, because not having simple character input means, is required to inconveniently manipulate the input means troublesome for the user, e.g. software keyboard displayed on the screen, and input an SSID and encryption key (or character or numerical string generating those).

Meanwhile, conversely, where the character or numerical string for generating an SSID or encryption key is changed on the television receiver incorporating a wireless LAN function, the user is required to manually set again the SSID and encryption key on all the wireless communication apparatuses of within the wireless network the relevant television receiver is in access. Likewise, there is a problem of inflicting a troublesomeness feeling upon the user.

DISCLOSURE OF THE INVENTION

The present invention, made in view of such a circumstance, enables a wireless communication apparatus such as a television receiver incorporating a wireless LAN function to access the existing wireless LAN network without forcibly requiring for the user to have high level knowledge about wireless LAN and troublesome input operation.

A communication apparatus of the invention is characterized by comprising: communication control means for carrying out communications with another apparatus through a predetermined network; recording-medium reading means for reading communication control information that setting is required for accessing the network, from a recording medium capable of being inserted/removed to/from the communication apparatus; and communication control information setting means for setting communication control information read out of the recording medium to the communication control means.

There can be further comprised of storage means for storing the communication control information, the communication control information setting means determining whether or not the communication control information is stored in the storage means wherein, in a case that the communication control information is not stored in the storage means, communication control information read out of the recording medium is set to the communication control means.

The communication control information setting means, in a case the recording medium is not inserted on the recording-medium reading means when setting communication control information, can make a predetermined display prompting a user to insert a recording medium recording communication control information to the recording-medium reading means.

The communication control information setting means, in a case communication control information is not recorded on the recording medium inserted on the recording-medium reading means when setting communication control information, can make a predetermined display prompting a user to insert another recording medium recording communication control information to the recording-medium reading means.

The communication control information setting means, in a case communication control information read out of the recording medium is set to the communication control means thus resulting in communication control error occurrence, can make a predetermined display prompting a user to insert another recording medium recording communication control information to the recording-medium reading means.

It is possible to further comprise communication control information change means for changing the communication control information set in the communication control information setting means, and recording-medium writing means for recording the communication control information changed to the recording medium.

The communication control means can be configured for accessing the network under a wireless communication scheme.

The communication control means can carry out communications under a wireless communication scheme conforming to a rating of IEEE (Institute of Electrical and Electronics Engineers) 802.11.

The communication control information can include information for identifying the network in the wireless communication scheme.

The communication control information can include information concerning encryption of data to be exchanged by wireless communications or information concerning a method of wireless connection with the other apparatus.

It can be a television receiver.

A communication control method of the invention is characterized by comprising: a recording-medium reading step of reading communication control information that setting is required for accessing a predetermined network, from a recording medium capable of being inserted/removed to/from the communication apparatus; a communication control information setting step of setting communication control information read out of the recording medium to predetermined communication control means; and a communication control step of carrying out communications with another apparatus through the network, according to the communication control information.

The communication control information setting step, in a case the recording medium is not inserted when setting communication control information, can make a predetermined display prompting a user to insert a recording medium recording communication control information to the recording-medium reading means.

The communication control information setting step, in a case communication control information is not recorded on the recording medium when setting communication control information, can make a predetermined display prompting a user to insert another recording medium recording communication control information to the recording-medium reading means.

The communication control information setting step, in a case that a communication control error occurs as a result of communications based on communication control information read out of the recording medium, can make a predetermined display prompting a user to insert another recording medium recording communication control information to the recording-medium reading means.

A program of the invention is characterized by comprising: a recording-medium reading step of reading communication control information that setting is required for accessing a predetermined network, from a recording medium capable of being inserted/removed to/from the communication apparatus; a communication control information setting step of setting communication control information read out of the recording medium to predetermined communication control means; and a communication control step of carrying out communications with another apparatus through the network, according to the communication control information.

In the communication apparatus, communication control method and program of the present invention, read is communication control information that setting is required for accessing a predetermined network, from a recording medium capable of being inserted/removed to/from the communication apparatus. The communication control information is set to the communication apparatus, thus carrying out communications with another apparatus.

BRIEF DESCRIPTION OF THE DRAWINGS

FIG. 4 is a figure showing a content of a wireless LAN information file.

BEST MODE FOR CARRYING OUT THE INVENTION

Figure 1:
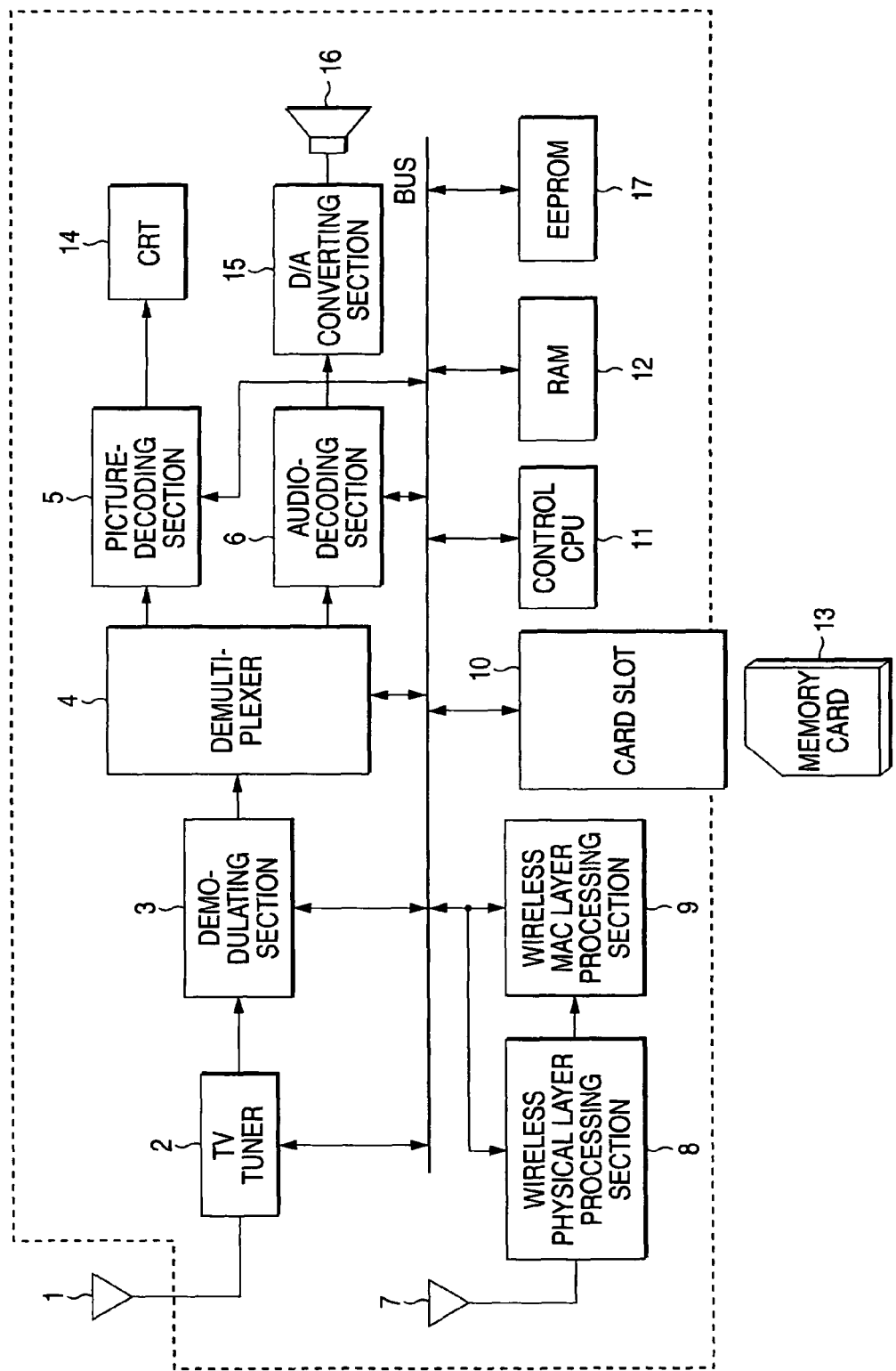
FIG. 1 is a hardware block diagram showing one embodiment configuration example of a television receiver to which the invention is applied.
Figure 2:
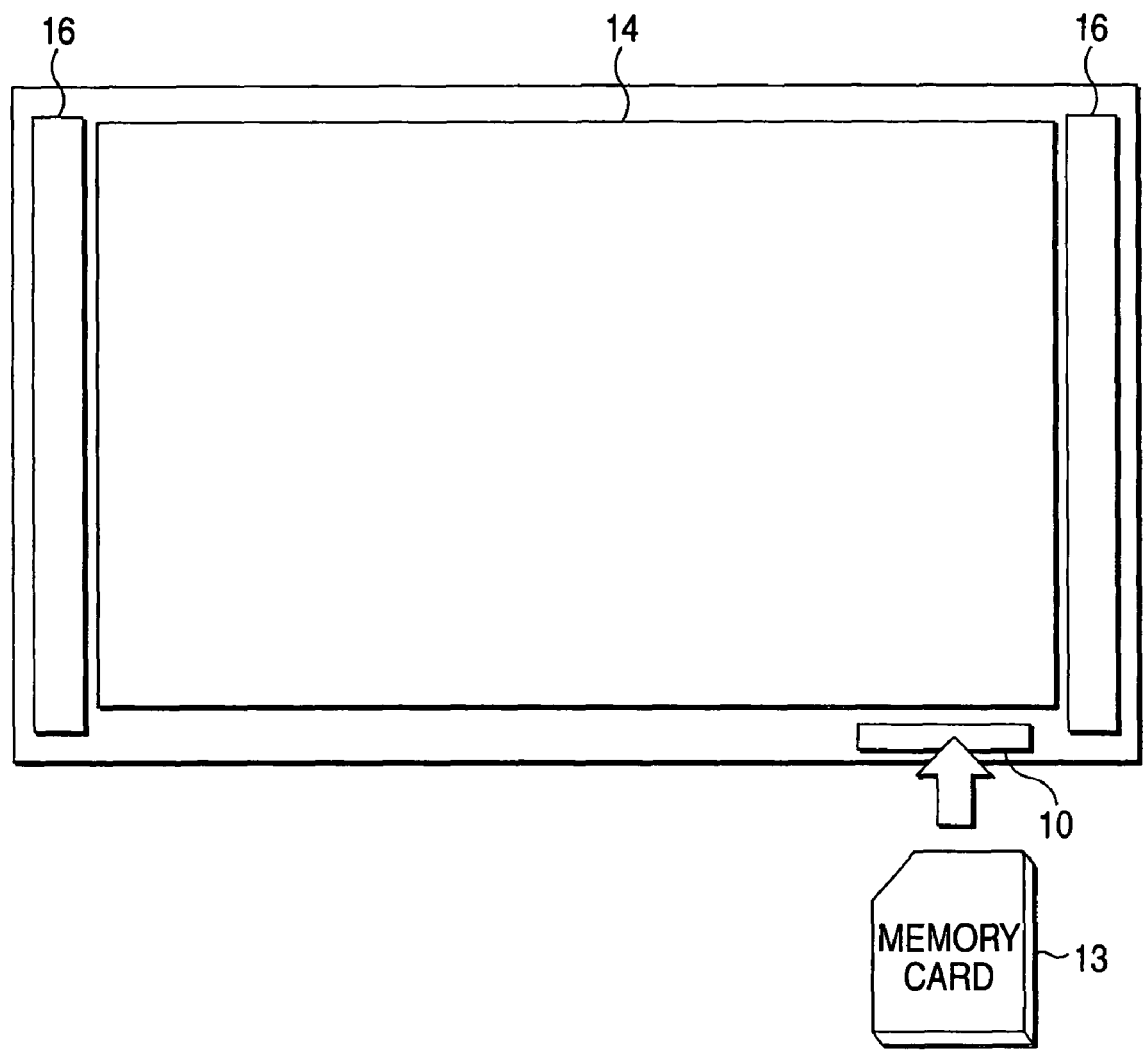
FIG. 2 is a plan view showing one embodiment configuration example of a television receiver to which the invention is applied.

FIG. 1 is a block diagram showing a configuration example in one embodiment of a digital television receiver to which the present invention is applied. FIG. 2 is a front view showing an external structural example of the television receiver.

An antenna 1 receives a television broadcast signal, for example, of a terrestrial wave, a BS (Broadcasting Satellite) or a CS (Communication Satellite), and supplies it to a TV (Television) tuner 2. The TV tuner 2 extracts, by wave-detection, a predetermined channel signal from the television broadcast signal from the antenna 1 according to control of a control CPU (Central Processing Unit) 11, and supplies it to a demodulator 3. The demodulating section 3 demodulates the television broadcast signal of from the TV tuner 2 according to control of the control CPU 11, and supplies it to a demultiplexer 4.

In the case the television broadcast signal supplied from the demodulating section 3 is a digital broadcast signal, e.g. of BS digital broadcast or CS digital broadcast, the demultiplexer 4 separates the signal into an MPEG (Moving Picture Experts Group)-encoded picture signal (coded picture signal) and audio signal (coded audio signal) according to control of the control CPU 11, and supplies the coded picture signal to a picture decoding section 5 and the coded audio signal to an audio decoding section 6.

Incidentally, the demultiplexer 4, even in the case supplied with a picture signal or audio signal from a RAM (Random Access Memory) 12 through the bus, supplies the picture signal and audio signal respectively to the picture decoding section 5 and the audio decoding section 6.

The picture decoding section 5 decompresses, by MPEG decoding, the coded picture signal from the demultiplexer 4 according to control of the control CPU 11, thereby decoding it into a picture signal. The picture decoding section 5, furthermore, converts the decoded picture signal into a picture signal, for example, in an NTSC (National Television System Committee) scheme and supplies to and displays on a CRT (Cathode Ray Tube) 14 as a display device.

The audio decoding section 6 MPEG-decodes the coded audio signal from the demultiplexer 4 and obtains a digital audio signal according to control of the control CPU 11, and supplies it to a D/A (Digital/Analog) converting section 15. The D/A converting section 15 converts the digital audio signal of from the audio decoding section 6 into an analog signal, and supplies it to a speaker 16 for output therefrom.

Herein, in one example of this embodiment, L (Left)-channel and R (Right)-channel speakers 16 are provided on the television receiver in a manner sandwiching the CRT 14 at left and right, as shown in FIG. 2.

An antenna 7 radiates, as a radio wave, a LAN frame outputted by a wireless-physical-layer processing section 8 and receives a radio wave transmitted from another wireless LAN apparatus capable of effecting wireless LAN communications, supplying it to the wireless-physical-layer processing section 8.

The wireless-physical-layer processing section 8 carries out physical-layer processing on the frame supplied from a wireless-MAC (Media Access Control)-layer processing section 9 (or the control CPU 11), and supplies it to the antenna 7. Namely, the wireless-physical-layer processing section 8, in the case of carrying out radio communications conforming to the rating of IEEE802.11a standard for example, OFDM (Orthogonal Frequency Division Multiplexing)-modulates the frame supplied from the wireless-MAC-layer processing section 9 and supplies it to antenna 7. Meanwhile, the wireless-physical-layer processing section 8, in the case of carrying out radio communications conforming to the rating of IEEE802.11b standard for example, modulates the frame supplied from the wireless-MAC-layer processing section 9 under a DSSS (Direct Sequence Spectrum Spread) scheme, and supplies it to the antenna 7.

Meanwhile, the wireless-physical-layer processing section 8 carries out physical-layer processing on the signal supplied from the antenna 7, and supplies it to the wireless-MAC-layer processing section 9 (or the control CPU 11). Namely, the wireless-physical-layer processing section 8 demodulates the signal supplied from the antenna 7 under the OFDM-demodulation or DSSS scheme, and supplies the resulting frame to the wireless-MAC-layer processing section 9.

The wireless-MAC-layer processing section 9 carries out wireless-MAC-layer processing on the IP packet supplied from the control CPU 11, and supplies it to the wireless-physical-layer processing section 8. Namely, the wireless-MAC-layer processing section 9 makes the IP packet supplied from the control CPU 11 into a frame conforming to the rating of IEEE802.11a, IEEE802.11b or IEEE802.11g for example, and supplies it to the wireless-physical-layer processing section 8.

Meanwhile, the wireless-MAC-layer processing section 9 carries out wireless-MAC-layer processing on the frame supplied from the wireless-physical-layer processing section 8, and supplies it to the control CPU 11. Namely, the wireless-MAC-layer processing section 9 decomposes the frame supplied from the wireless-physical processing section 8 and constitutes an IP packet according to a method conforming to the rating of IEEE802.11a, IEEE802.11b or IEEE802.11g for example, and supplies it to the control CPU 11.

Incidentally, the frame composition and decomposition to be carried out in the wireless-MAC-layer processing section 9 can be done by the control CPU 11. In this case, data exchange is possible between the wireless-physical-processing section 8 and the control CPU 11 without passed through the wireless-MAC-layer processing section 9.

A memory card 13 can be inserted to and removed from the card slot 10. The card slot 10 is connected to the bus. Accordingly, data reading and writing is possible to and from the memory card 13 inserted in the card slot 10 through the bus.

Herein, in this embodiment, the card slot 10 is provided underneath the CRT 14 in the front surface of the television receiver, as shown in FIG. 2. This allows the user to easily insert and remove the memory card 13 into and from the card slot 10. Incidentally, although one card slot 10 is provided in FIGS. 1 and 2, a plurality of card slots can be provided in the television receiver.

The control CPU 11 expands (loads) and executes, in a RAM 12, the program recorded in an EEPROM (Electrically Erasable Programmable Read Only Memory) 17, thereby placing the various blocks constituting the television receiver under control and implementing various processes. Namely, the control CPU 11 reads out the data, for example, stored in the RAM 12 and packetizes it into an IP packet, supplying same to the wireless-MAC-layer processing section 9. Meanwhile, the control CPU 11 decodes the IP packet supplied, for example, from the wireless-MAC-layer processing section 9, and supplies the data obtained as a result of decoding to the RAM 12. Furthermore, the control CPU 11 makes various settings for wireless LAN communications.

Herein, the present embodiment, because the control CPU 11 generates an IP packet as noted above, employs IP as a wireless LAN communication protocol. However, the other than IP can be employed as communication protocol.

The RAM 12 is set up by being stored with the information required for wireless LAN communications. Also, the RAM 12 is expanded with a program read out from the EEPROM 17. Furthermore, the RAM 12 temporarily stores the date required for the CPU 11 to carry out processing.

The memory card 13, a portable and small-sized semiconductor memory, is structured to be easily inserted into and removed from the card slot 10. The memory card 13 is stored (recorded) with SSID, cipher key, operation mode, and further net mask (sub-net mask), and IP address that are required for wireless LAN communications.

The EEPROM 17 stores the information to be necessarily held even in the state the television receiver is powered off. Namely, the EEPROM 17 is stored with the program to be executed by the control CPU 11. Also, the EEPROM 17 stores various pieces of information including SSID, cipher key, operation mode, net mask, and IP address that are required for wireless LAN communications.

In the television receiver configured as above, wireless LAN communications are implemented as follows.

Namely, in the case that the information required for carrying out wireless LAN communications is stored in the EEPROM 17, the control CPU 11 reads the information required for wireless LAN communications out of the EEPROM 17, and sets up it to the RAM 12 by storage. From then on, the control CPU 11 looks up the information set up in the RAM 12, to implement wireless LAN communications.

Meanwhile, in the case the information required for wireless LAN communications is not stored in the EEPROM 17, in the case the information needed for wireless LAN communications is changed or further in the case the wireless LAN network as a destination-of-access is changed by an instruction from the user or the like, the control CPU 11 causes the CRT 14 or speaker 16 to output a message requesting for inserting in the card slot 10 the memory card 13 recording the information needed in accessing a wireless LAN network to be desirably accessed.

When the user inserts the memory card 13 in the card slot 10, the control CPU 11 reads information out of the memory card 13 and sets up it to the RAM 12. From then on, the control CPU 11 looks up the information set up on the RAM 12, and makes an access to a desired wireless LAN network. Furthermore, the control CPU 11 causes the EEPROM 17 to store the information, for example, read from the memory card 13. In this case, in the next access to the wireless LAN network, the information required in accessing the wireless LAN network (information required for wireless LAN communications) can be read from the EEPROM 17 without inserting the memory card 13 in the card slot 10.

Meanwhile, in the case the user operates a not-shown remote commander (hereinafter, referred suitably to as a remote control) thereby changing the SSID, cipher key or the like set on the television receiver, the control CPU 11 can be made write the changed information onto the memory card 13 inserted in the card slot 10. In this case, the memory card 13 is inserted in another radio communication apparatus having a wireless LAN communication function similar to the television receiver of FIG. 1. By making a setting of wireless LAN communications according to the information stored in the memory card 13, the radio communication apparatus is allowed to access the same wireless LAN network as that the television receiver is in access.

Figure 3:
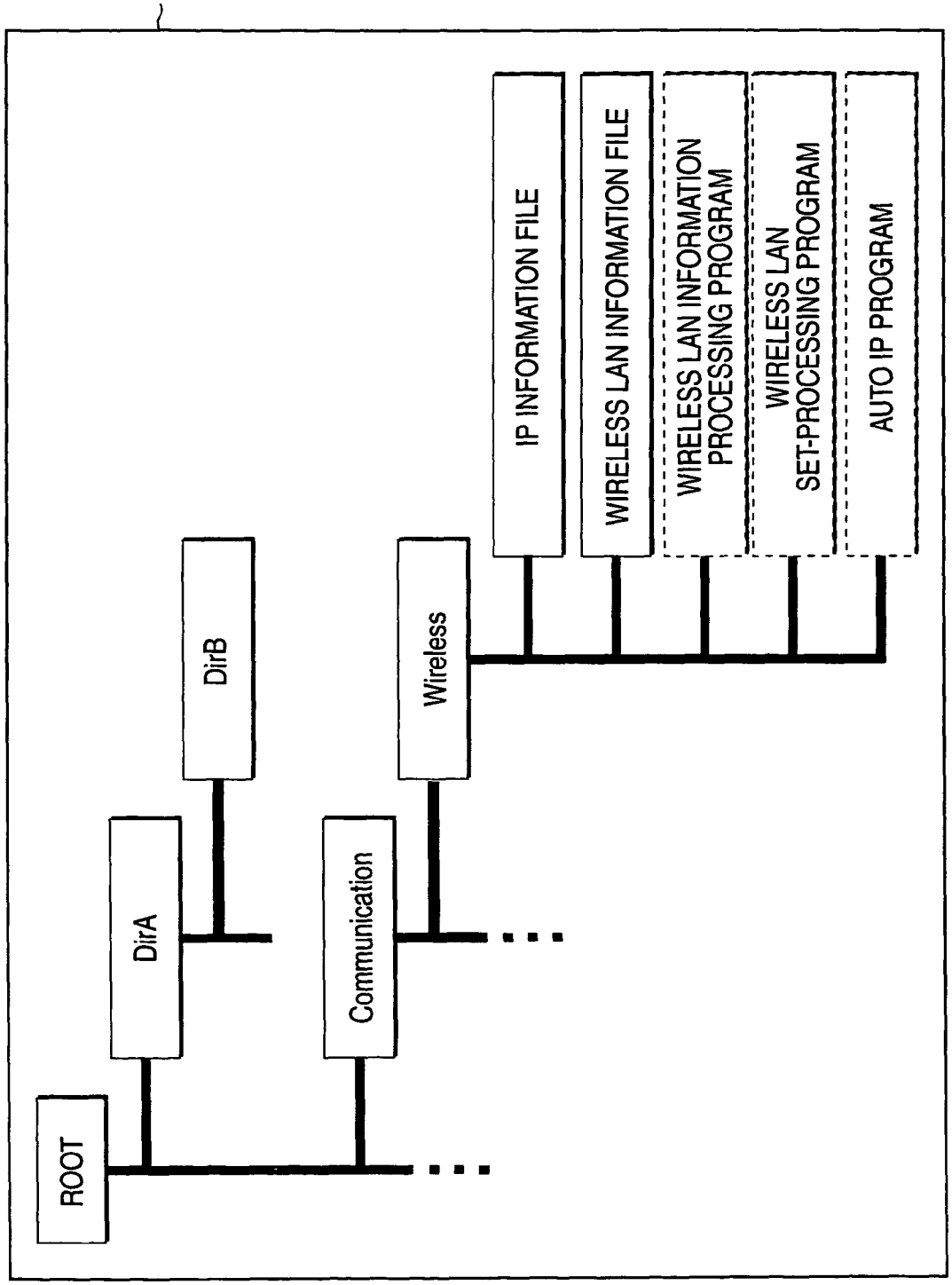
FIG. 3 is a figure showing a logic configuration of a memory card 13.

Now, FIG. 3 shows a logic configuration in the memory card 13.

Concerning the memory card 13, FAT (File Allocation Table) system, for example, is adopted as a file system thereof. Incidentally, there is no especial limitation as to what file system is adopted for the memory card 13.

In the embodiment of FIG. 3, directory DirA and Communication are provided as directories lower by one than a root directory root. Also, directory DirB is provided as a directory lower by one than the directory DirA. Furthermore, directory Wireless is provided as a directory lower by one than the directory Communication.

There is no especial limitation as to in what directory configuration the memory card 13 is made. In the embodiment of FIG. 3, it is essential to provide a directory having a name, e.g. Communications, in the layer lower by one than the root directory root, as a directory to store the information related to communications. Furthermore, in the embodiment of FIG. 3, it is essential to provide a directory having a name, e.g. Wireless, in the layer lower by one than the directory Communication, as a directory to store the information related to wireless LAN of among communication-related information.

The directory Wireless is to store an IP information file and a wireless LAN information file.

The IP information file describes an IP address, net mask (sub-net mask), etc. as IP information required in communication based on the communication protocol IP. The wireless LAN information file describes SSID, cipher key and operation mode as wireless LAN information required in making wireless LAN communications.

FIG. 4 shows a concrete example of the wireless LAN information file of FIG. 3.

The wireless LAN information file employs a file name, for example, of "WirelessConfig.txt" as a previously fixed file name. As mentioned above, the directory the wireless LAN information file is to be stored is /root/Communication/Wireless/ that is previously decided while the file name of the wireless LAN information file is previously fixed as "WirelessConfig.txt". Accordingly, on the apparatus of the television receiver of FIG. 1 or the like to be inserted by the memory card 13, wireless LAN information can be obtained if /root/Communication/Wireless/WirelessConfig.txt is accessed.

Incidentally, similarly to the wireless LAN information file, the file name of the IP information file shown in FIG. 3 is also previously decided. Accordingly, on the apparatus of the television receiver of FIG. 1 or the like the memory card 13 is to be inserted, IP information can be obtained similarly to wireless LAN information.

The wireless LAN information file describes, as wireless LAN information, SSID, cipher key and operation mode, as shown in FIG. 4.

Herein, in the wireless LAN information file, SSID is described correspondingly to the name (network name) provided to the wireless LAN network identified by the relevant SSID.

Meanwhile, in the wireless LAN information file, it is described as for operation mode whether to carry out communications in peer-to-peer mode or communications in Infrastructure mode.

Furthermore, in the wireless LAN information file, it is described as for cipher whether encryption based on cipher key is given valid or invalid. Furthermore, in the case that encryption based on cipher key is valid, descriptions are made on a key length of the cipher key, whether the cipher key is by either of ASCII code or hexadecimal number, and a character string to provide a cipher key.

Figure 5:
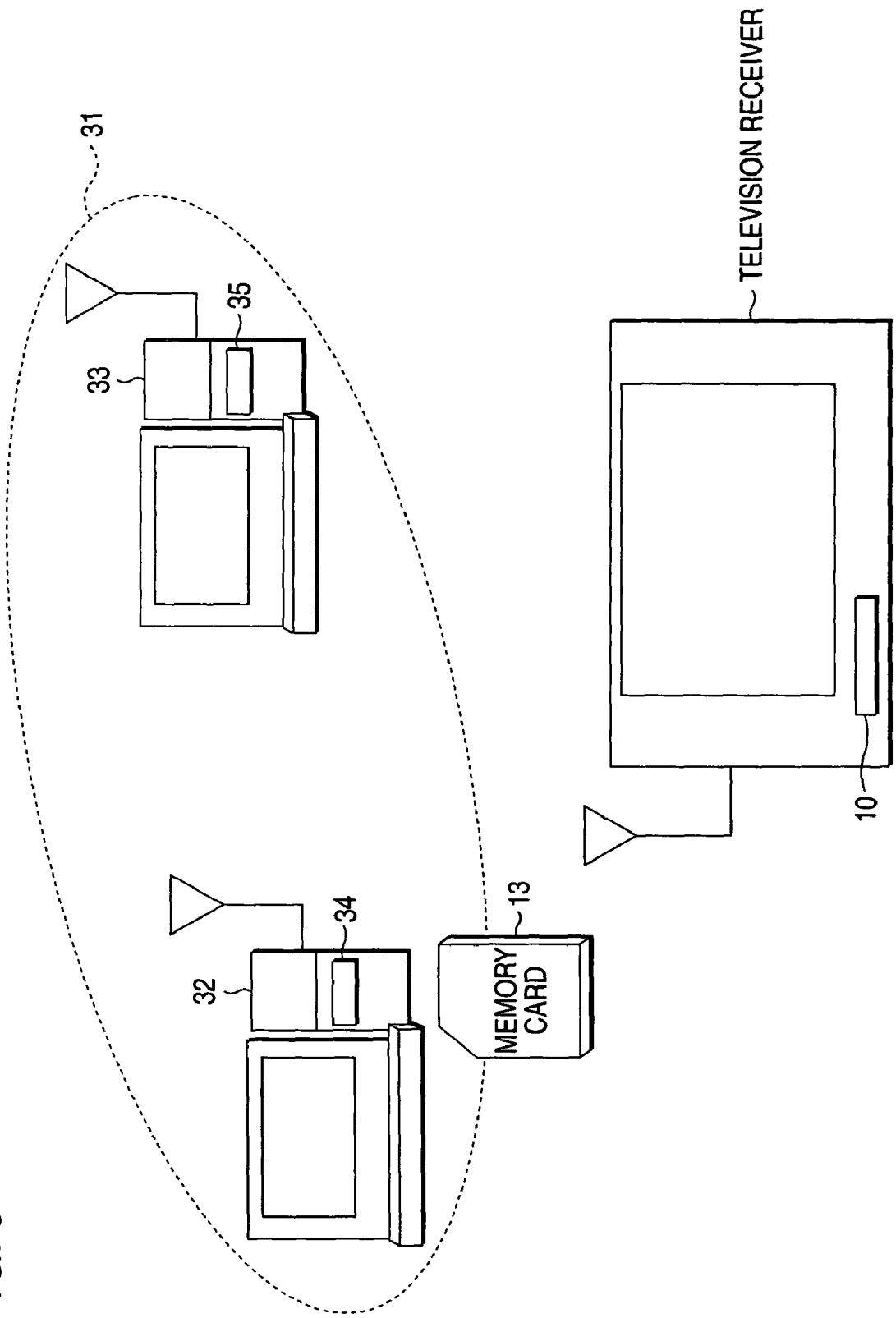
FIG. 5 is a figure showing the manner the television receiver accesses the existing wireless LAN network.

Referring now to FIG. 5, explanation is made on the procedure for the television receiver of FIG. 1 to access the existing wireless LAN network.

Incidentally, explanation is made below on the assumption that IP, for example, is employed as a communication protocol in carrying out wireless LAN communications.

In FIG. 5, wireless LAN apparatuses 32 and 33, such as personal computers, constitute a wireless LAN network 31. Accordingly, for the wireless LAN apparatuses 32 and 33, the same wireless LAN information, i.e. same SSID, same cipher key and same operation mode, are set in order to access the same wireless LAN network 31. Furthermore, for the wireless LAN apparatuses 32 and 33 respectively, there are set IP information for making an IP communication through the wireless LAN network 31, i.e. the same net mask and a unique IP address belonging to a sub-net as defined by the net mask.

In the case that the television receiver of FIG. 1 with no setting for wireless-LAN-based communications is now participated in the wireless LAN network 31, the user inserts the memory card 13 to the card slot 34 of the wireless LAN apparatus 32.

Namely, the wireless LAN apparatus 32 constituting for the wireless LAN network 31 has a card slot 34 for insertion and removal of the memory card 13. The user inserts the memory card 13 to the card slot 34.

Incidentally, in the embodiment of FIG. 5, the wireless LAN apparatus 33 also has a card slot 35 the memory card 13 is to be inserted and removed. In this case, the memory card 13 may be inserted in the card slot 35 of the wireless LAN apparatus 33 instead of in the card slot 34 of the wireless LAN apparatus 32.

In the wireless LAN apparatus 32 whose card slot 34 is inserted with the memory card 13, the wireless LAN information and IP information set up on itself is written to the memory card 13.

Incidentally, on the wireless LAN apparatus 32, the IP information to be written to the memory card 13 includes all the IP addresses of the apparatuses in access to the wireless LAN network 31. Accordingly, in the embodiment of FIG. 5, on the wireless LAN apparatus 32, the IP information to be written to the memory card 13 includes the respective IP addresses of the respective wireless LAN apparatuses 32 and 33.

Herein, the respective wireless LAN apparatuses 32 and 33 constituting the wireless LAN network 31 recognize the IP addresses of all the wireless LAN apparatuses constituting the wireless LAN network 31, i.e. wireless LAN apparatuses 32 and 33 in FIG. 5, in order to specify the opposite end of IP communications. The wireless LAN apparatus 32 writes, as IP information, the recognized IP addresses of the wireless LAN apparatuses 32 and 33 onto the memory card 13.

Thereafter, the user takes the memory card 13 out of the card slot 34 of the wireless LAN apparatus 32, and inserts it to the card slot 10 of the television receiver of FIG. 1. The television receiver of FIG. 1 reads out the wireless LAN information and IP information written by the wireless LAN apparatus 32 from the memory card 13 inserted to the card slot 10, and makes a setting required for wireless LAN access and IP communications by using the wireless LAN information and IP information.

This allows the television receiver of FIG. 1 to communicate with the wireless LAN apparatuses 32 and 33 through the wireless LAN network 31.

Incidentally, after the television receiver of FIG. 1 is made accessible to the wireless LAN network 31 in the above manner, the memory card 13 is inserted in the card slot 10.

Thus, the wireless LAN information and IP information set up in the television receiver can be written to the memory card 13.

In this case, assuming that the wireless LAN apparatus 33 has no setting for communication based on wireless LAN for example, by inserting the memory card 13 in its card slot 35, it is possible to provide a setting required for wireless LAN connection and IP communications on the wireless LAN apparatus 33 by the use of the wireless LAN information and IP information recorded on the memory card 13 similarly to the case on the television receiver of FIG. 1. Due to this, the wireless LAN apparatus 33, having no setting for communications based on wireless LAN is also allowed to have an access to the wireless LAN network 31.

Now, as explained in FIG. 5, on the television receiver of FIG. 1, in the case no setting is made in carrying out communications based on wireless LAN, setting for communications based on wireless LAN is made by inserting the memory card 13 to the card slot 10.

Figure 6:
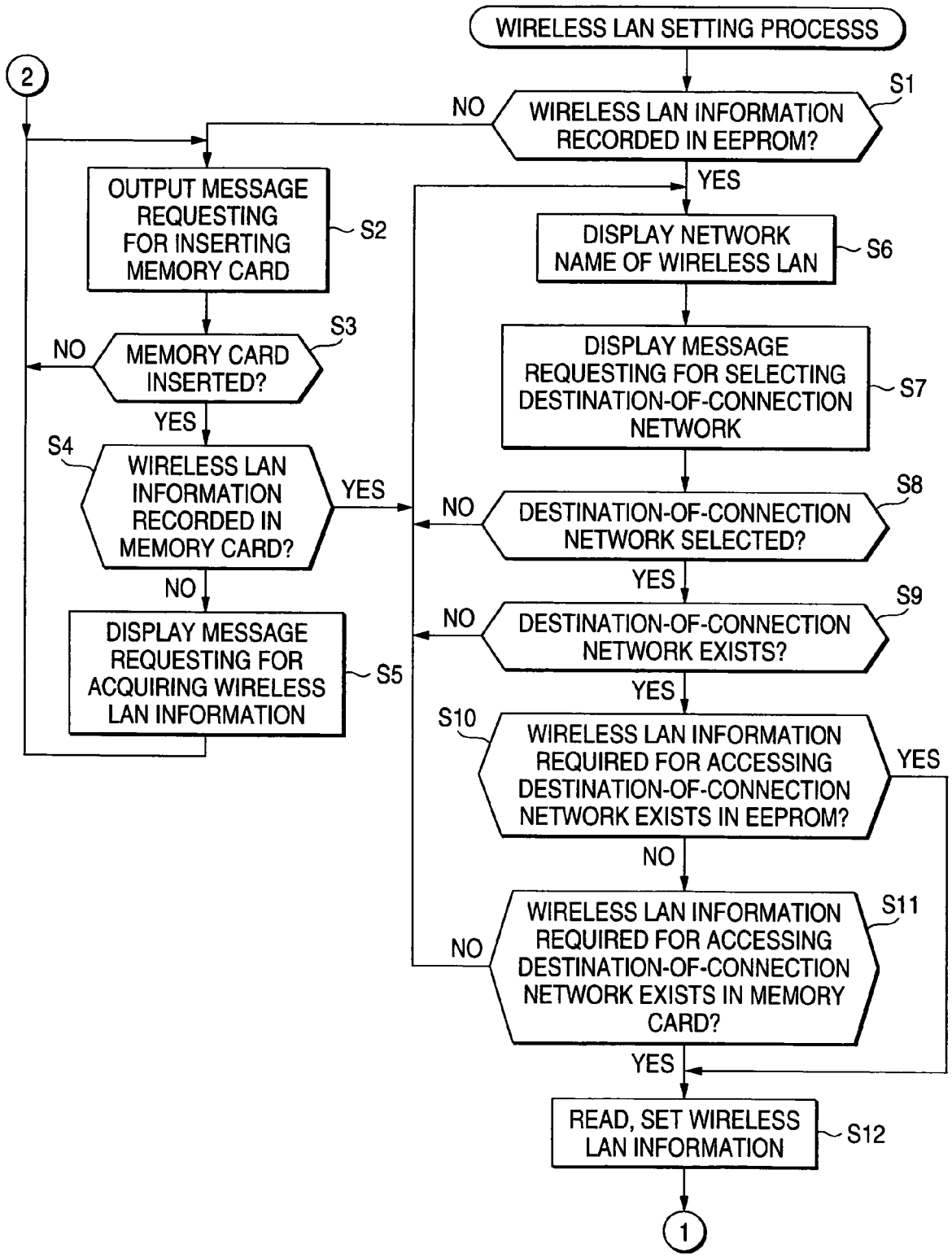
FIG. 6 is a flowchart explaining a wireless LAN setting process.
Figure 7:
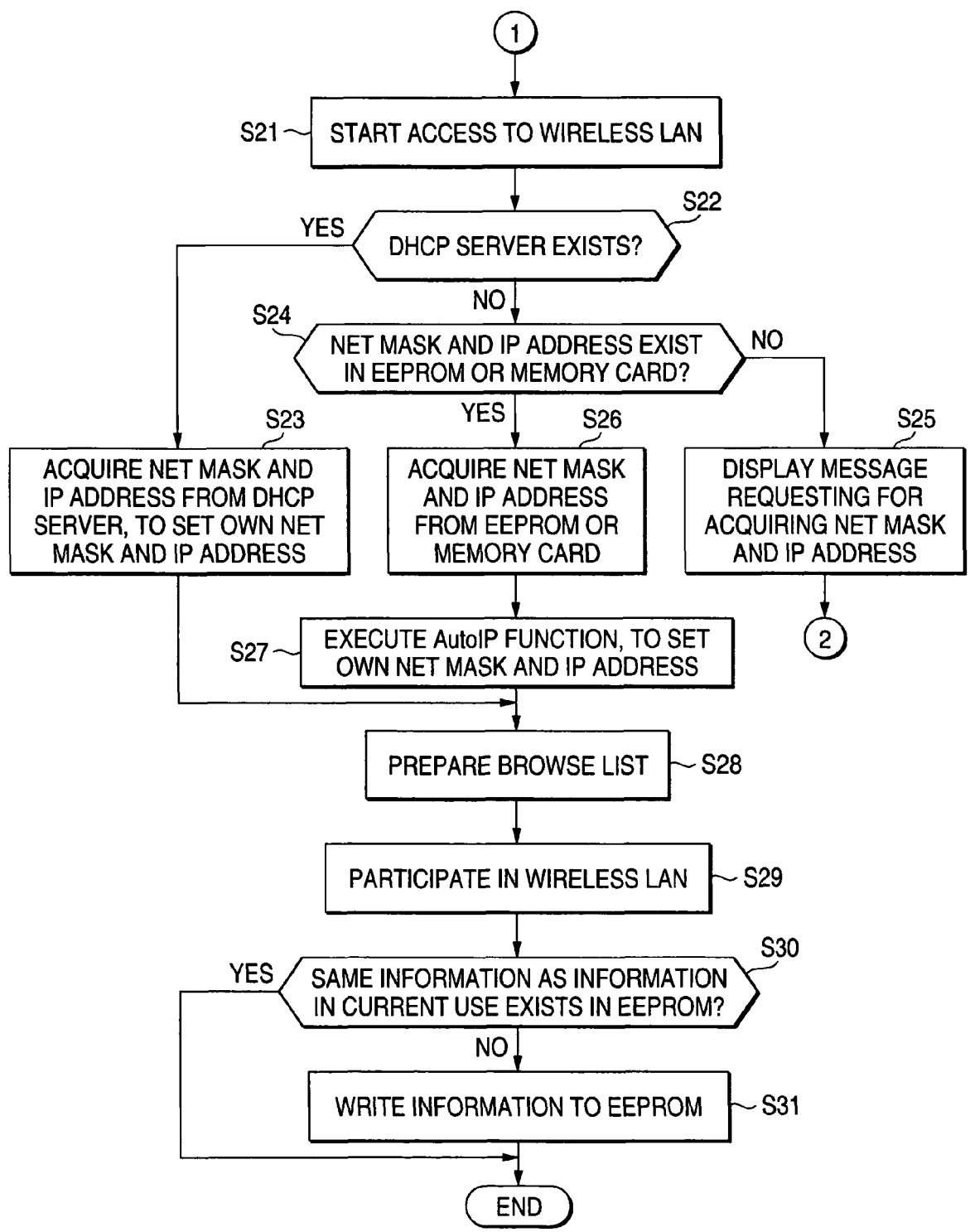
FIG. 7 is a flowchart explaining a wireless LAN setting process.

Consequently, referring to a flowchart of FIGS. 6 and 7, explained is a wireless LAN setting process, carried out on the television receiver of FIG. 1, for communications based on wireless LAN.

For example, in case the user powers on the television receiver or make a request for wireless LAN connection by operating the remote control or so, the control CPU 11 expands and executes, in the RAM 12, the program for wireless LAN setting process among the programs stored in the EEPROM 17, thereby carrying out the following wireless LAN setting process.

Namely, in the wireless LAN setting process, at first, the control CPU 11 in step S1 determines whether wireless LAN information is stored in the EEPROM 17 or not. In the case determined in the step S1 that wireless LAN information is stored in the EEPROM 17, e.g. in the case the television receiver has ever accessed a wireless LAN network in the past and the wireless LAN information used in that access is stored in the EEPROM 17, the process skips steps S2 to S5 over to step S6. The control CPU 11 looks up the SSID of the wireless LAN information stored in the EEPROM 17, thereby causing the CRT 14 to display a list of network names (FIG. 4) of the wireless LAN network associated with the SSID. The process proceeds to step S7.

Namely, there is a case that the wireless LAN information concerning a plurality of wireless LAN networks is stored in the EEPROM 17 besides the wireless LAN information concerning one wireless LAN network. In step S6, displayed are network names of all the wireless LAN networks whose wireless LAN information is stored in the EEPROM 17.

Figure 8:
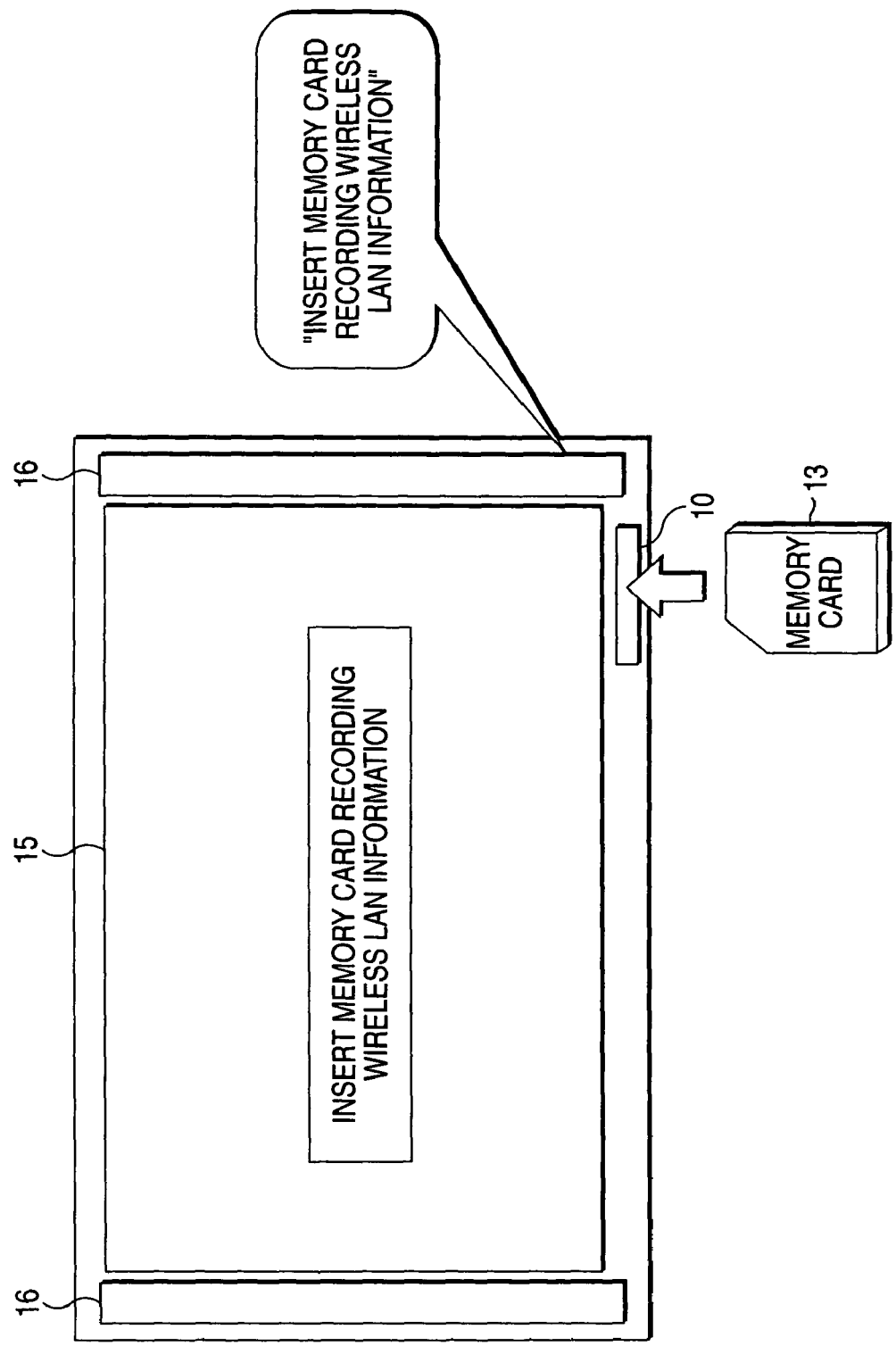
FIG. 8 is a figure showing an output example of a message by the television receiver.

Meanwhile, in the case determined in the step S1 that wireless LAN information is not stored in the EEPROM 17, i.e. in the case it is immediately after purchasing the television receiver wherein the television receiver has never accessed a wireless LAN network in the past and wireless LAN information is not stored in the EEPROM 17, the process proceeds to step S2. The control CPU 11 generates a memory-card-insertion request message (e.g. "Insert Memory Card Recording Wireless LAN Information") requesting to insert the memory card 13 in the card slot 10, and displays it as an image on the CRT 14 as shown in FIG. 8 for example or outputs it by voice through the speaker 16.

Then, the process proceeds to step S3 where the control CPU 11 determines whether the memory card 13 is inserted in the slot 10 or not. In the step S3, in the case determined that the memory card 13 is not inserted in the card slot 10, the process returns to step S2, to subsequently repeat the similar process.

Meanwhile, in the step S3, in the case determined that the memory card 13 is inserted in the card slot 10, the process proceeds to step S4. The control CPU 11 determines whether or not wireless LAN information is recorded in the memory card 13 inserted in the card slot 10.

Herein, whether wireless LAN information is recorded in the memory card 13 or not can be determined by looking up the directory /root/Communication/Wireless/ in the memory card 13 and by the presence or absence a wireless LAN information file "WirelessConfig.txt" there as shown in FIG. 3.

In the step S4, in the case determined that wireless LAN information is not recorded in the memory card 13, the process proceeds to step S5. The control CPU 11 generates a message requesting for recording wireless LAN information onto the memory card 13, and causes the CRT 14 to display it (or the speaker 16 to output it). The process returns to the step S2.

Herein, the message to be displayed on the CRT 14 in the step S5 is to request that, for example, the memory card 13 is inserted in a wireless LAN apparatus constituting for the existing wireless LAN network, to execute a hereinafter-referred wireless LAN information process thereby recording wireless LAN information to the memory card 13. The user who looked this message, in the case the wireless LAN network 31 is constituted by the wireless LAN apparatuses 32 and 33 for example as shown in FIG. 5, withdraws the memory card 13 from the television receiver slot 10 and inserts the memory card 13 to the card slot 34 of the wireless LAN apparatus 32 (or card slot 35 of the wireless LAN apparatus 33), thereby causing the wireless LAN apparatus 32 (or 33) to carry out a hereinafter-referred wireless LAN information process and write wireless LAN information onto the memory card 13. Then, the user inserts the memory card 13 written with the wireless LAN information to the card slot 10 of the television receiver, whereby it is determined in step S4 that wireless LAN information is recorded on the memory card 13.

In the step S4, in the case determined that wireless LAN information is recorded on the memory card 13, the process proceeds to step S6. The control CPU 11 looks up the SSID of the wireless LAN information recorded in the memory card 13, thereby causing the CRT 14 to display a list of network names (FIG. 4) of the wireless LAN network associated with the SSID. The process proceeds to step S7.

Namely, there is a case that the memory card 13 stores the wireless LAN information about a plurality of LAN networks besides the wireless LAN information about one wireless LAN network, similarly to the case of the above EEPROM 17. In step S6, there are displayed the network names of all the wireless LAN networks whose wireless LAN information is stored in the memory card 13.

After processing the step S6, the process proceeds to step S7 where the control CPU 11 causes the CRT 14 to display a message requesting to select a to-be-accessed wireless LAN network. The process proceeds to step S8. In the step S8, the control CPU 11 determines whether or not the use has selected a to-be-accessed wireless LAN network by operating the remote control or the like. In step S8, in case it is determined that a to-be-accessed wireless LAN network has not been selected, the process returns to step S6, to subsequently repeat the similar process.

Meanwhile, in case it is determined in the step S8 that a to-be-accessed wireless LAN network has been selected, the process proceeds to step S9. The control CPU 11 determines whether there exists the selected to-be-accessed wireless LAN network (hereinafter, suitably referred to as a destination-of-access network) or not. In the case determined in step S9 that there exists no destination-of-access network, the process returns to step S6. This prompts the user to select another wireless LAN network.

Meanwhile, if it is determined in step 9 that there exists a destination-of-access network, the process proceeds to step S10. The control CPU 11 determines whether or not the wireless LAN information required in accessing the destination-of-access network is recorded (stored) in the EEPROM 17. In the step S10, in case determined that the wireless LAN information required in accessing the destination-of-access network is recorded in the EEPROM 17, the process skips step S11 over to step S12. The control CPU 11 reads out the wireless LAN information required in accessing the destination-of-access network from the EEPROM 17, and sets up it, by storage, to the RAM 12. The process proceeds to step S21 of FIG. 7.

Meanwhile, in the case determined in step S10 that the wireless LAN information required in accessing the destination-of-access network is not recorded in the EEPROM 17, the process proceeds to step S11. The control CPU 11 determines whether or not the wireless LAN information required in accessing the destination-of-access network is recorded (stored) in the memory card 13. In the case determined in step S11 that the wireless LAN information required in accessing the destination-of-access network is not recorded in the memory card 13, the process returns to step S6. This prompts the user to select another wireless LAN network.

Meanwhile, in the case determined in step S11 that the wireless LAN information required in accessing the destination-of-access network is recorded in the memory card 13, the process proceeds to step S12. The control CPU 11 reads out the wireless LAN information required in accessing the destination-of-access network from the memory card 13, and sets up it, by storage, to the RAM 12. The process proceeds to step S21 of FIG. 7.

In step S21 of FIG. 7, the control CPU 11 starts a wireless access to a destination-of-access network according to the wireless LAN information set up in the RAM 12. Namely, the control CPU 11 accesses a wireless LAN network (destination-of-access network) identified by the SSID of the wireless LAN information set up on the RAM 12 through the wireless-MAC-layer processing section 9, wireless-physical-layer processing section 8 and antenna 7, in a peer-to-peer or Infrastructure mode represented by the operating mode of the wireless LAN information also set upon the RAM 12. Furthermore, the control CPU 11 carries out communications by way of the destination-of-access network while making an encryption based on a cipher key of the wireless LAN information set up on the RAM 12.

After accessing the destination-of-access network as a wireless LAN network in the above manner, setting is made to carry out IP protocol communications.

Namely, after the process of the step S21, the process proceeds to step S22. The control CPU 11 determines whether or not there exists a DHCP (Dynamic Host Configuration Protocol) server for dynamically assigning IP addresses, within the destination-of-access network.

In the step S22, in the case determined that a DHCP server exists within the destination-of-access network, the process proceeds to step S23. The control CPU 11 acquires a net mask of the destination-of-access network, an IP address of the wireless LAN apparatus participating in the destination-of-access network (constituting for the destination-of-access network) and an IP address to be assigned to itself, from the DHCP server through the antenna 7, wireless-physical-layer processing section 8 and wireless-MAC-layer processing section 9. Furthermore, in step S23, the control CPU 11 sets up the net mask acquired from the DHCP server and the own IP address, by storage to the RAM 12. The process proceeds to step S28.

In the step S28, the control CPU 11 prepares a browse list as a list of IP addresses of the wireless LAN apparatuses (including the television receiver of FIG. 1, herein) constituting the destination-of-access network, from the IP addresses acquired from the DHCP server in step S23. The process proceeds to step S29.

Meanwhile, in the step S22, in the case determined there is no DHCP server within the destination-of-access network, the process proceeds to step S24. The control CPU 11 determines whether or not there is stored IP information (IP address and net mask) of the wireless LAN apparatus constituting the destination-of-access network in the memory card 13 or EEPROM 17. In the step S24, in the case determined that there is stored no IP information of the wireless LAN apparatus constituting the destination-of-access network in the memory card 13 nor EEPROM 17, i.e. in the case that the television receiver of FIG. 1 has never participated in the destination-of-access network in the past and there is stored no IP information of the wireless LAN apparatus constituting the destination-of-access network in the memory card 13 nor EEPROM 17, the process proceeds to step S25. The control CPU 11 displays, on the CRT 14, a message requesting for acquiring IP information. The process returns to step S2.

Herein, the message displayed on the CRT 14 in step S25 is to request that, for example, the memory card 13 is inserted in the wireless LAN apparatus constituting the existing wireless LAN network, to record IP information to the memory card 13 by executing a wireless LAN information process, hereinafter referred. The user who looked this message, in the case the wireless LAN network is constituted by wireless LAN apparatuses 32 and 33 as shown in FIG. 5, withdraws the memory card 13 from the slot 10 of the television receiver and inserts the memory card 13 in the card slot 34 of the wireless LAN apparatus 32 (or the card slot 35 of the wireless LAN apparatus 33). The wireless LAN apparatus 32 (or 34) is caused to carry out a hereinafter-referred wireless LAN information process and write IP information onto the memory card 13. Then, the user inserts the memory card 13 written with the IP information to the card slot 10 of the television receiver. Due to this, in step S24, it is determined that IP information is recorded in the memory card 13.

Incidentally, the message displayed on the CRT 14 in step S25 is to request that the memory card 13 is inserted in the wireless LAN apparatus constituting the existing wireless LAN network, to record IP information to the memory card 13 by executing a wireless LAN information process, similarly to the message to be displayed on the CRT 14 in step S5 of FIG. 6. In the case that the memory card 13 is inserted in the wireless LAN apparatus constituting the existing wireless LAN network to thereby execute a wireless LAN information process, the wireless LAN information and IP information of the existing wireless LAN network is recorded to the memory card 13, as hereinafter referred. Accordingly, in the case that the user in step S5 inserts the memory card 13 in the wireless LAN apparatus constituting the existing wireless LAN network and executes a wireless LAN information process according to the message displayed on the CRT 14 in step S5, the wireless LAN information and IP information of the existing wireless LAN network is recorded to the memory card 13. Namely, in this case, the wireless LAN information and IP information of the existing wireless LAN network is recorded in the memory card 13. Accordingly, when the existing wireless LAN network is selected as a destination-of-access network, there is no case of a determination in step S24 that the IP information of a wireless LAN apparatus constituting a destination-of-access network is not recorded in the memory card 13.

Meanwhile, in the case determined in the step S24 that the IP information of a wireless LAN apparatus constituting a destination-of-access network is recorded in either of the memory card 13 or the EEPROM 17, i.e. in the case that the television receiver of FIG. 1 has ever participated in the destination-of-connection network in the past and the IP information of a wireless LAN apparatus constituting the destination-of-access network is recorded in either of the memory card 13 or the EEPROM 17, the process proceeds to step S26. The CPU 11 acquires a network mask of the destination-of-access network and an IP address of the wireless LAN apparatus participated in the destination-of-access network (constituting the destination-of-access network), from the memory card 13 or EEPROM 17. The process proceeds to step S27.

In step S27, the control CPU 11 acquires an IP address and net mask to be assigned by AutoIP function to itself, and sets up the IP address and net mask, by storage, on the RAM 12. The process proceeds to step S28.

Namely, the EEPROM 17 is stored with an AutoIP program for acquiring an IP address never used over the LAN. In step S27, the control CPU 11 reads the AutoIP program out of the EEPROM 17, and expands and executes it on the RAM 12 to thereby acquire an IP address and net mask to be assigned to itself.

In step S28, the control CPU 11 prepares a browse list as a list of IP addresses of the wireless LAN apparatuses (including the television receiver of FIG. 1, herein) constituting the destination-of-access network from the IP address acquired from the memory card 13 or EEPROM 17 in the step S26 and the IP address acquired by the AutoIP function in step S27. The process proceeds to step S29.

In step S29, the control CPU 11 starts to participate in the destination-of-access network based on IP protocol communications, i.e. starts an IP protocol communications with the wireless LAN apparatus constituting the destination-of-access network. The process proceeds to step S30. Incidentally, in IP protocol communications, the IP address of the opposite end of communications can be recognized by looking up the browse list prepared in step S28.

In step S30, the control CPU 11 determines whether or not there is stored, in the EEPROM 17, the same wireless LAN information and IP information as the wireless LAN information and IP information being currently used in the access to the destination-of-access network. In the case determined in the step S30 that there is stored, in the EEPROM 17, the same wireless LAN information and IP information as the wireless LAN information and IP information being currently used, the step S31 is skipped over and the wireless LAN setting process is ended.

Meanwhile, in the step S30, in the case determined that there is not stored, in the EEPROM 17, the same wireless LAN information and IP information as the wireless LAN information and IP information being currently used, the control CPU 11 writes the wireless LAN information and IP information being currently used to the EEPROM 17, thus ending the wireless LAN setting process.

Herein, after the wireless LAN information and IP information currently being used in the access to the destination-of-access network is written to the EEPROM 17 in step S31, the memory card 13 is not necessarily inserted upon thereafter accessing the destination-of-access network.

Next, as mentioned above, in the case a message requesting for recording the wireless LAN information and IP information to the memory card 13 is displayed on the CRT 14 in step S5 of FIG. 6 or in step S25 of FIG. 7, the user inserts the memory card 13, for example, in the card slot 34 of the to-be-accessed wireless LAN apparatus 32 constituting the existing wireless LAN network of FIG. 5 (or the card slot 35 of the wireless LAN apparatus 33), to cause the wireless LAN apparatus 32 (or 33) to carry out wireless LAN information processing.

Consequently, although wireless LAN information process is explained in the below, the hardware configuration of the wireless LAN apparatus 32 is explained in advance thereof. Incidentally, the wireless LAN apparatus 33 is similar in its hardware configuration to the wireless LAN apparatus 32, and hence the explanation thereof is omitted.

Figure 9:
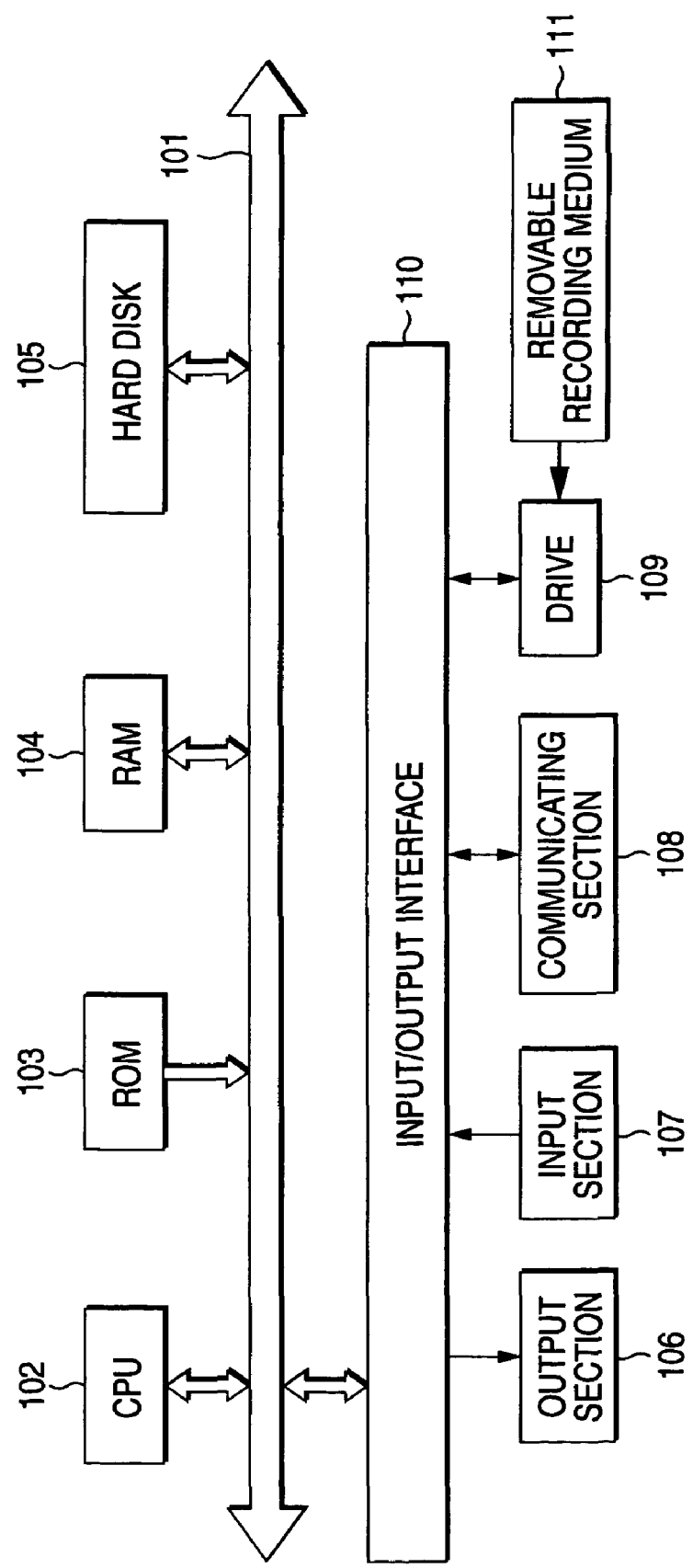
FIG. 9 is a block diagram showing a hardware configuration example of a wireless LAN apparatus 32 (33).

FIG. 9 shows a hardware configuration example of the wireless LAN apparatus 32 that is a computer.

The wireless LAN apparatus 32, as a computer, can be made carry out various processes by being installed with a program. The program can be previously recorded on a hard disk 105 or ROM 103 as a recording medium incorporated within the computer.

Otherwise, the program can be temporarily or permanently stored (recorded) on a removable recording medium 111, such as a flexible disc, a CD-ROM (Compact Disc Read Only Memory), an MO (Magneto Optical Disc, a DVD (Digital Versatile Disc), a magnetic disc or a semiconductor memory. Such a removable recording medium 111 can be supplied as so-called package software.

Incidentally, the program can be installed from a removable recording medium 111 as mentioned above onto the wireless LAN apparatus 32. Besides, it can be wireless-transferred from a download site to the wireless LAN apparatus 32 through an artificial satellite for digital satellite broadcast, or wire-transferred to the wireless LAN apparatus 32 through a network such as a LAN or the Internet. The wireless LAN apparatus 32, at its communicating section 108, can receive the transferred program and install it to an incorporated hard disk 105.

The wireless LAN apparatus 32 incorporates a CPU (Central. Processing Unit) 102. The CPU 102 is connected with an input/output interface 110 through a bus 101. The CPU 102, if inputted an instruction by being operated or so at an input section 107 structured by a keyboard, a mouse, a mike and the like by the user through the input/output interface 110, executes the program stored in the ROM (Read Only Memory) 103 in accordance therewith. Otherwise, the CPU 102 loads, to a RAM (Random Access Memory) 104, a program stored on the hard disk 105, a program transferred from a satellite or network and received at a communicating section 108 thus being installed to the hard disk 105, or a program read out of the removable recording medium 111 mounted on the drive 109 and installed to the hard disk 105, thereby executing it. Due to this, the CPU 102 carries out various processes. The CPU 102 causes its processing result to be outputted from an output section 106 structured by an LCD (Liquid Crystal Display), a speaker or the like, for example, through the input/output interface 110, or to be sent from the communication section 108, or further to be recorded to the hard disk 105, as required.

Incidentally, in FIG. 9, the communicating section 108 at least has a function possessed by the antenna 7 of FIG. 1, wireless-physical-layer processing section 8 and wireless-MAC-layer processing section 9.

Meanwhile, in FIG. 9, the drive 109 has a card slot 34 (FIG. 5) to/from which the memory card 13 can be inserted and removed.

Herein, the program for executing a wireless LAN information process (hereinafter, referred to as a wireless LAN information processing program) is assumably recorded on a removable recording medium 111, e.g. CD-ROM, and packaged with the television receiver of FIG. 1, to be sold to the user. Accordingly, in order to cause the wireless LAN apparatus 32 to carry out a wireless LAN information process, the user is required to mount the removal recording medium 111 on the drive 109 and install the wireless LAN information processing program.

Incidentally, the wireless LAN information processing program, furthermore the program for wireless LAN setting process in the foregoing FIGS. 6 and 7 and the AutoIP program can be previously stored in the directory /Communication/Wireless/ of the memory card 13 as shown by the dotted line in FIG. 3, and then installed to the wireless LAN apparatus 32 or the television receiver of FIG. 1.

Figure 10:
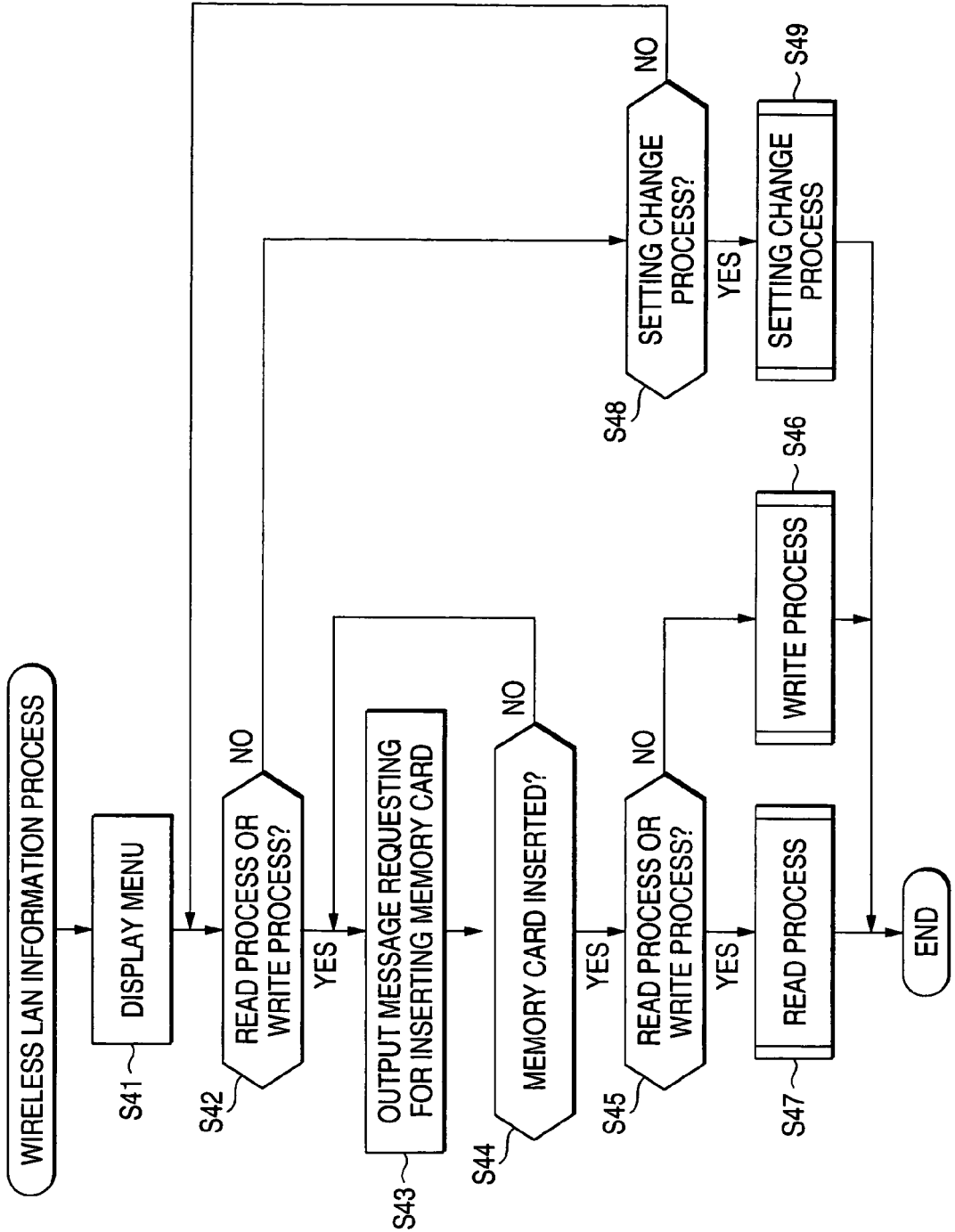
FIG. 10 is a flowchart explaining a wireless LAN information process.

Now, explained is a wireless LAN information process with reference to a flowchart of FIG. 10.

Incidentally, wireless LAN information process can be implemented on any apparatus capable of being installed with and executing a program for wireless LAN information process. However, explanation herein is on the assumption that the wireless LAN apparatus 32, for example, is to carry out a wireless LAN information process.

In the wireless LAN apparatus 32, at first, the CPU 102 in step S41 causes the output section 106 to display a menu screen. The process proceeds to step S42.

Herein, the menu screen is to select any of a write process to write wireless LAN information and IP information to the memory card 13, a read process to read out the wireless LAN information and IP information written on the memory card 13, and a set change process to change the wireless LAN information and IP information currently being set. On the menu screen, displayed are icons respectively represent these of write process, read out process and set change process.

In step S42, the CPU 102 determines whether or not the user has selected a write process or a read out process on the menu screen by operating the input section 107. In step S42, in the case determined any of a write process or a read out process has been selected, i.e. in the case that the user has operated any of the icons respectively representative of a write process and a read out process displayed on the menu screen by the input section 107, the process proceeds to step S43. The CPU 102 causes the output section 106 to display a message requesting to insert the memory card 13 in the drive 109. The process proceeds to step S44.

In step S44, the CPU 102 determined whether or not the memory card 13 has been inserted in the drive 109. In the step S44, in the case determined that the memory card 13 is not inserted in the drive 109, the process returns to the step S43, to subsequently repeat the similar process.

Meanwhile, in the step S44, in the case determined that the memory card 13 has been inserted in the drive 109, the process proceeds to step S45. The CPU 102 determines which one the user has selected of a write process and a read out process.

In step S45, in the case determined that the user has selected a write process, the process proceeds to step S46, to make a hereinafter-referred write process. Thereafter, the wireless LAN information process is ended. Meanwhile, in the step S45, in the case determined that the user has selected a read out process, the process proceeds to step S47, to make a hereinafter-referred read out process. Thereafter, the wireless LAN information process is ended.

On the other hand, in step S42, in the case determined that neither a write process nor a read out process has been selected, the process proceeds to step S48. The CPU 102 determines whether or not the user has selected a set change process on the menu screen by operating the input section 107. In the step S48, in the case determined that a set change process has not been selected, the process returns to step S42, to subsequently repeat the similar process.

Meanwhile, in step S48, in the case determined that a set change process has been selected, i.e. in the case that the user has operated the icon representative of a set change process displayed on the menu screen by the input section 107, the process proceeds to step S49. A hereinafter-referred set change process is carried out and thereafter the wireless LAN information process is ended.

Figure 11:
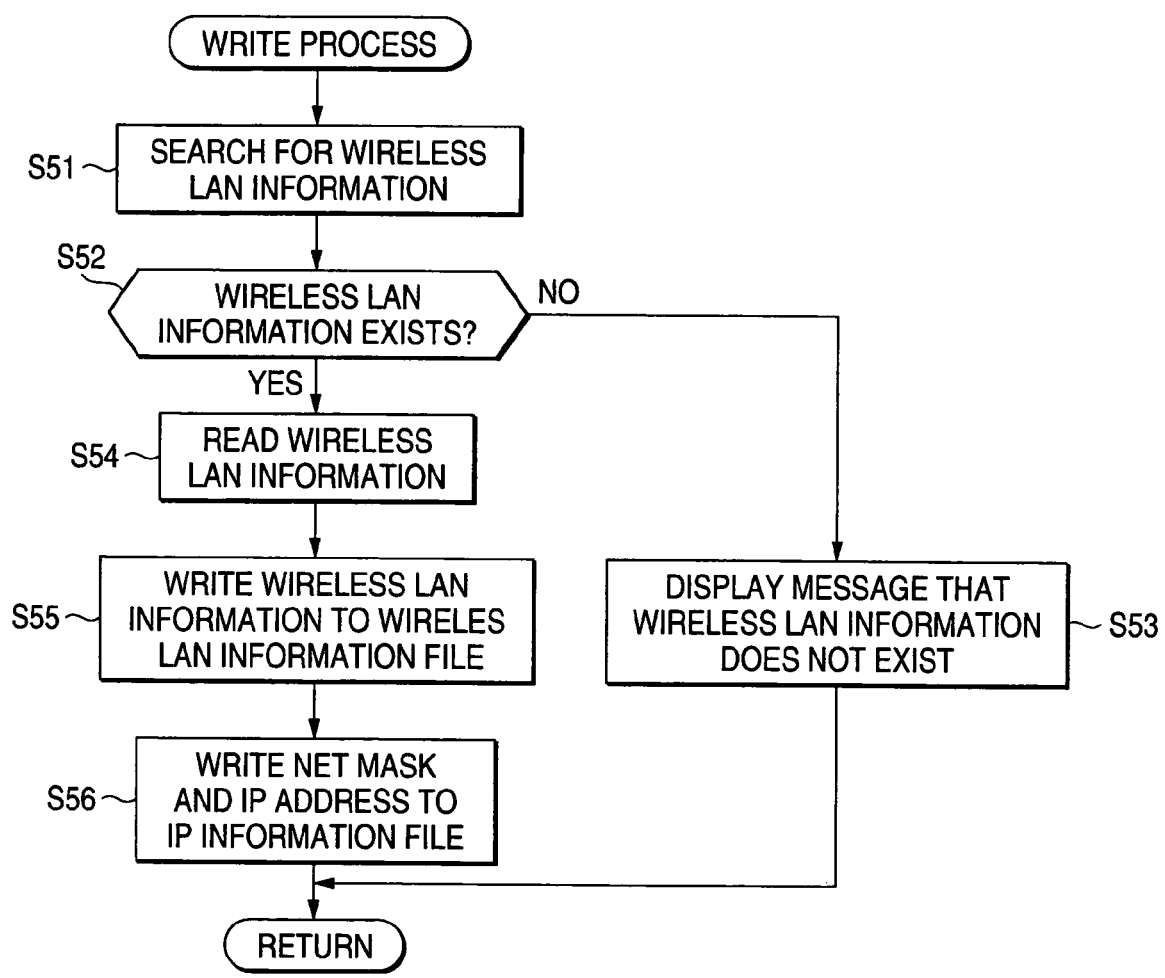
FIG. 11 is a flowchart explaining a writing process.

Now, referring to a flowchart of FIG. 11, a write process is explained that is to be executed in step S46 of FIG. 10.

In a write process, at first, the CPU 102 in step S51 searches for the wireless LAN information and IP information existing in the wireless LAN apparatus 32, i.e. in the FIG. 9 hardware configuration, search is for wireless LAN information and IP information through the RAM 104 and hard disk 105. The process proceeds to step S52.

In step S52, the CPU 102 determines whether or not wireless LAN information and IP information exists in the wireless LAN apparatus 32, on the basis of a search result in step S51. In step S52, in the case determined that wireless LAN information and IP information does not exist in the wireless LAN apparatus 32, the process proceeds to step S53. The CPU 102 causes the output section 106 to display a message that there exists no wireless LAN information and IP information, and the process returns.

Meanwhile, in the case determined in step S52 that wireless LAN information and IP information exists in the wireless LAN apparatus 32, the process proceeds to step S54. The CPU 102 acquires the wireless LAN information and IP information existing in the wireless LAN apparatus 32, i.e. reads out the wireless LAN information and IP information stored on the RAM 104 or the hard disk 105. The process proceeds to step S55.

In step S55, the CPU 102 writes, as a wireless LAN information file, the wireless LAN information read out in the step S54 to the directory /Communication/Wireless/ (FIG. 3) of the memory card 13 inserted on the drive 109. The process proceeds to step S56. In the step S56, the CPU 102 writes, as an IP information file, the IP information read out in the step S54 to the directory /Communication/Wireless/ (FIG. 3) of the memory card 13 inserted on the drive 109. The process returns.

Figure 12:
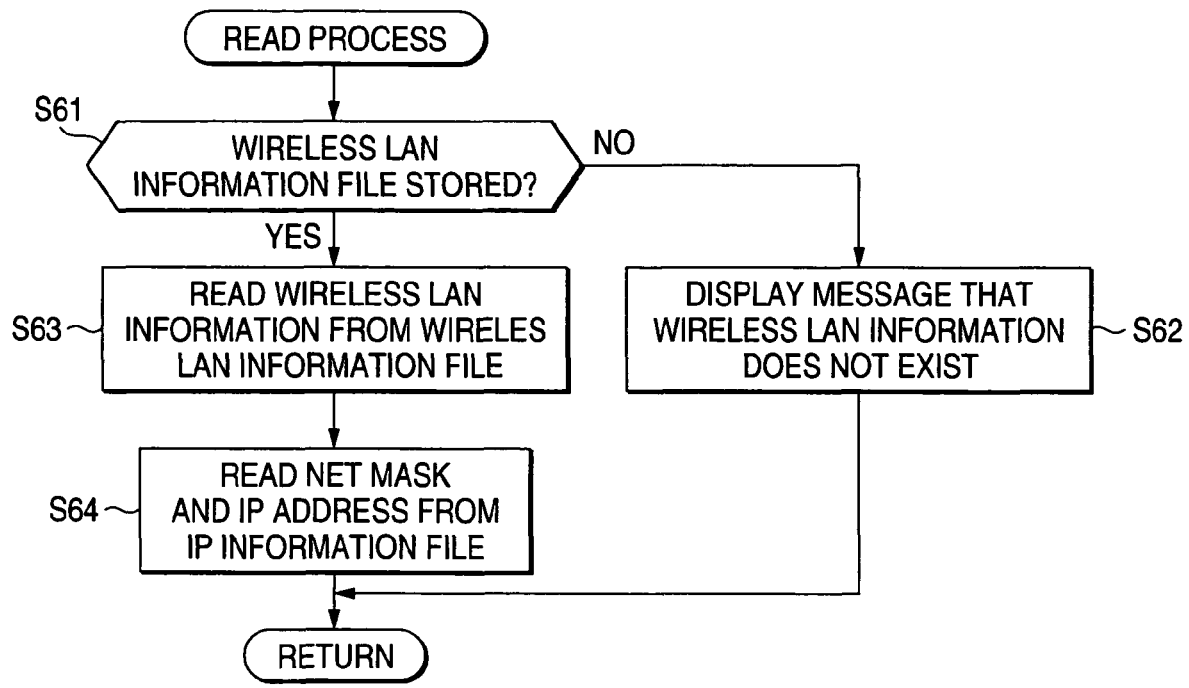
FIG. 12 is a flowchart explaining a reading process.

Now, referring to a flowchart of FIG. 12, a read out process is explained that is to be executed in step S47 of FIG. 10.

In a read out process, at first, the CPU 102 in step S61 determines whether or not wireless LAN information and IP information is recorded in the memory card 13 inserted on the drive 109.

In the case determined in the step S61 that wireless LAN information and IP information is not recorded in the memory card 13, the process proceeds to step S62. The CPU 102 causes the output section 106 to display a message that there is no recorded wireless LAN information and IP information, and the process returns.

Meanwhile, in the case determined in step S61 that wireless LAN information and IP information is recorded in the memory card 13, i.e. in the case there is a wireless LAN information file and IP information file in the directory /Communication/Wireless/ (FIG. 3) of the memory card 13, the process proceeds to step S63. The CPU 102 reads wireless LAN information out of the wireless LAN information file of the memory card 13, and records it to the RAM 104 or hard disk 105, for example. The process proceeds to step S64.

In step S64, the CPU 102 reads IP information out of the IP information file of the memory card 13, and records it to the RAM 104 or hard disk 105, for example. The process returns.

Incidentally, on the wireless LAN apparatus 32 under execution of a wireless LAN information process, the setting for wireless LAN communications is possible on the basis of the wireless LAN information and IP information respectively read out in steps S63 and S64.

Figure 13:
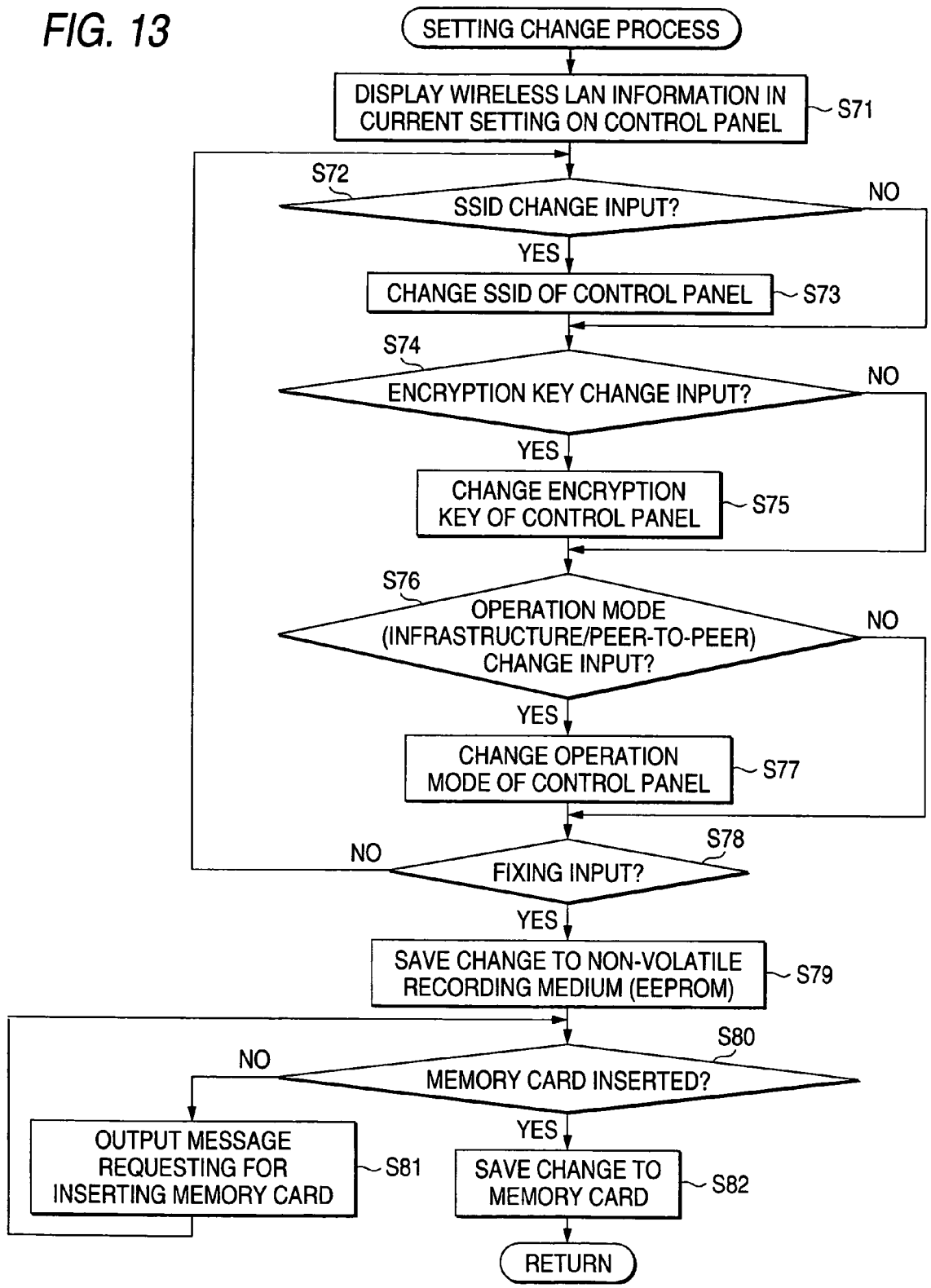
FIG. 13 is a flowchart explaining a set change process.

Now, referring to a flowchart of FIG. 13, a set change process is explained that is to be executed in step S49 of FIG. 10.

In a set change process, at first, the CPU 102 in step S71 recognizes the wireless LAN information currently set in the wireless LAN apparatus 32, and generates a screen displaying the wireless LAN information (hereinafter, referred suitably to as a control panel). Furthermore, in step S71, the CPU 102 causes the output section 106 to display a control panel, and the process proceeds to step S72.

In the step S72, the CPU 102 determined whether or not there is a change input for changing the SSID of the wireless LAN information displayed on the control panel by user's operation on the input section 107. In step S72, in the case determined that there has been a change input for the SSID, the process proceeds to step S73. The CPU 102 changes the SSID displayed on the control panel, correspondingly to the change input. The process proceeds to step S74.

Meanwhile, in the case determined in the step S72 that there has not been a change input for the SSID, the process skips step S73 over to step S74. The CPU 102 determines whether or not there has been a change input for changing a cipher key of the wireless LAN information displayed on the control panel by user's operation on the input section 107. In the case determined in the step S74 that there has been a change input for a cipher key, the process proceeds to step S75. The CPU 102 changes the cipher key displayed on the control panel, correspondingly to the change input. The process proceeds to step S76.

Meanwhile, in the case determined in the step S74 that there has not been a change input on a cipher key, the process skips step S75 over to step S76. The CPU 102 determines whether or not there has been an change input for changing the operation mode of the wireless LAN information displayed on the control panel by user's operation on the input section 107. In the case determined in the step S76 that there has been a change input on operation mode, the process proceeds to step S77. The CPU 102 changes the operation mode displayed on the control panel, correspondingly to the change input. The process proceeds to step S78.

Meanwhile, in the case determined in the step S76 that there has not been a change input for operation mode, the process skips over step S77 over to S78. The CPU 102 determines whether or not there has been a fixing input for fixing a change of the wireless LAN information displayed on the control panel by user's operation on the input section 107.

In the case determined in step S78 that there is no fixing input, the process returns to step S72, to subsequently repeat the similar process.

Meanwhile, in the case determined in step S78 that there is a fixing input, the process proceeds to step S79. The CPU 102 records the wireless LAN information changed in the step S73, S75 or S77 to, for example, a hard disk 105 as anonvolatile recording medium. Furthermore, it changes the setting for wireless LAN access according to the changed wireless LAN information. The process proceeds to step S80.

Herein, in the case that setting change process is made on the television receiver of FIG. 1, the changed wireless LAN information in step S79 is recorded to the EEPROM 17, for example.

In step S80, the CPU 102 determines where or not the memory card 13 is inserted on the drive 109. In the case determined not inserted, the process proceeds to step S81. The CPU 102 causes the output section 106 to display a message requesting for inserting the memory card 13 to the drive 109. The process returns to step S80.

Meanwhile, in the case determined in step S80 that the memory card 13 is inserted on the drive 109, the process proceeds to step S82. The CPU 102 writes the changed wireless LAN information to the memory card 13, and the process returns.

Incidentally, for example, in case the above setting change process is made on the wireless LAN apparatus 32 to thereby write the wireless LAN information changed and thereafter, in the television receiver of FIG. 1, the memory card 13 is inserted in the card slot 10 to thereby carrying our the read-out process of FIG. 12, the wireless LAN information changed can be set on the television receiver of FIG. 1. Also, by making a set change process on the television receiver of FIG. 1, the wireless LAN information can be easily changed.

As in the above, by inserting the memory card 13 in any of the wireless LAN apparatuses constituting for the existing wireless LAN network, the user is allowed to record the wireless LAN information and IP information required in accessing the existing wireless LAN network onto the memory card 13. In the television receiver of FIG. 1, because the wireless LAN information recorded in the memory card 13 and further IP information is read out to make a setting required in wireless LAN access, the user even if not possessing especial knowledge is allowed to access a desired wireless LAN network without making a troublesome operation (without inflicting troublesomeness feeling upon the user) by inserting the memory card 13 in the card slot 10.

Meanwhile, for example, in the case that wireless LAN information is changed by making a set change process of FIG. 13 on the television receiver of FIG. 1, by inserting the memory card 13 recording the wireless LAN information changed to the wireless LAN apparatus 32 or 33 (FIG. 5) as another wireless LAN apparatus and the read-out operation of FIG. 12 is carried out, it is possible to easily set the information required in configuring a wireless LAN network by the television receiver of FIG. 1 and the wireless LAN apparatus 32 or 33.

Herein, in the present specification, the process steps, describing a program for the control CPU 11 (FIG. 1) or CPU 102 (FIG. 9) to execute various processes, must not be processed chronologically along the order described as a flowchart, but include processes to be executed in parallel or individually (e.g. parallel processing or object-based processing).

Incidentally, the present invention is applicable not also to a wireless LAN but also to a combined wireless-and-wired LAN. Also, the invention is applicable to other radio communications than the communications called LAN (communications conforming to the rating under IEEE802.11). Furthermore, the invention is applicable to every apparatus having a radio communication function besides television receivers.

Meanwhile, as for the memory card 13, it is possible to sell a memory card 13 previously recording predetermined wireless LAN information by being packaged with the television receiver of FIG. 1.

INDUSTRIAL APPLICABILITY

As in the above, according to the present invention, radio communications are available at between radio-communication apparatuses without inflicting troublesomeness feeling upon the user.

What is claimed is:

1. A communication apparatus, the communication apparatus being a TV receiver comprising:
    communication control means for carrying out communications with a second apparatus through a predetermined network;
    recording-medium reading means for reading communication control information being required for accessing the predetermined network from a recording medium capable of being inserted in and removed from the TV receiver; and
    communication control information setting means for setting communication control information read from the recording medium to the communication control means,
    wherein the TV receiver allows a user to operate a remote controller to change the communication control information read from the recording medium and records the changed communication control information back to the recording medium,
    wherein the recording medium stores a communication process program that causes the TV receiver to display a menu requiring a user to select one communication information process from a read process, a write process, or a set change process,
    wherein the read process reads out the communication control information from the recording medium, the write process writes the communication control information to the recording medium, and the set change process changes the communication control information that is currently used,
    wherein the recording medium is logically configured to have communication related information stored in a communication folder and to have communication unrelated information stored in additional folders, the communication folder further having wireless communication related information stored in a wireless communication folder,
    wherein the communication control means prepares a browse list of IP addresses of each apparatus constituting the predetermined network so that the IP address of each apparatus of the predetermined network is recognized by reading the browse list,
    wherein the TV receiver includes a first antenna that receives television broadcast signals and a second antenna that radiates and receives a radio wave for wireless LAN communications,
    wherein when the TV receiver has previously accessed one or more wireless networks, the communication control means displays one or more wireless network names of the one or more wireless networks, each wireless network name associated with an SSID,
    wherein when the TV receiver has previously accessed the predetermined network and a DHCP is determined not to be within the predetermined network, the communication control means acquires an IP address and net mask of the predetermined network to be assigned by an AutoIP function, and
    wherein after the TV receiver initiates wireless access to the predetermined network, the communication control means acquires a net mask of the predetermined network, an IP address of other communication apparatuses in the predetermined network, and an IP address to be assigned to itself if a DHCP is determined to be within the predetermined network.

2. A TV receiver according to claim 1, further comprising storage means for storing the communication control information,
wherein the communication control information setting means determining whether the communication control information is stored in the storage means,
wherein, when the communication control information is not stored in the storage means, communication control information read from the recording medium is set to the communication control means.

3. A TV receiver according to claim 1,
wherein when setting communication control information, the communication control information setting means, when the recording medium is not inserted in the recording-medium reading means provides a predetermined display prompting a user to insert a recording medium with communication control information recorded therein.

4. A TV receiver according to claim 1,
wherein when setting communication control information, the communication control information setting means, in a case that communication control information is not recorded on the recording medium inserted in the recording-medium reading means provides a predetermined display prompting a user to insert a second recording medium with communication control information recorded therein.

5. A TV receiver according to claim 1,
wherein the communication control information setting means, in a case that communication control information read from the recording medium is set to the communication control means and results in a communication control error provides a predetermined display prompting a user to insert a second recording medium with communication control information recorded therein.

6. A TV receiver according to claim 1, further comprising communication control information change means for changing the communication control information set in the communication control information setting means; and
recording-medium writing means for recording the changed communication control information to the recording medium.

7. A TV receiver according to claim 1,
wherein the communication control means is configured for accessing the network under a wireless communication scheme.

8. A TV receiver according to claim 7,
wherein the communication control means carries out communications under a wireless communication scheme conforming to a rating of IEEE (Institute of Electrical and Electronics Engineers) 802.11.

9. A TV receiver according to claim 7,
wherein the communication control information comprises information for identifying the network in the wireless communication scheme.

10. A TV receiver according to claim 7,
wherein the communication control information comprises information concerning encryption of data to be exchanged by wireless communications or information concerning a method of wireless connection with the second apparatus.

11. A communication control method comprising:
a configuring step of logically configuring a recording medium to have communication related information stored in a communication folder and to have communication unrelated information stored in additional folders, the communication folder further having wireless communication related information stored in a wireless communication folder;
a recording-medium reading step of reading communication control information being required for accessing a predetermined network from the recording medium capable of being inserted in and removed from a communication apparatus, the communication apparatus being a TV receiver;
a communication control information setting step of setting communication control information read from the recording medium to a predetermined communication control means; and
a communication control step of carrying out communications with a second apparatus through the predetermined network, according to the communication control information,
wherein the recording medium stores a communication process program that causes to display a menu requiring a user to select one communication information process from a read process, a write process, or a set change process,
wherein the read process reads out the communication control information from the recording medium, the write process writes the communication control information to the recording medium, and the set change process changes the communication control information that is currently used,
wherein the communication control step prepares a browse list of IP addresses of each apparatus constituting the predetermined network so that the IP address of each apparatus of the predetermined network is recognized by reading the browse list,
wherein the TV receiver includes a first antenna receives television broadcast signals and a second antenna that radiates and receives a radio wave for wireless LAN communications,
wherein when the TV receiver has previously accessed one or more wireless networks, the communication control means displays one or more wireless network names of the one or more wireless networks, each wireless network name associated with an SSID,
wherein when the TV receiver has previously accessed the predetermined network and a DHCP is determined not to be within the predetermined network, the communication control means acquires an IP address and net mask of the predetermined network to be assigned by an AutoIP function, and
wherein after the TV receiver initiates a wireless access to the predetermined network, the communication control means acquires a net mask of the predetermined network, an IP address of other communication apparatuses in the predetermined network, and an IP address to be assigned to itself if a DHCP is determined to be within the predetermined network.

12. A communication control method according to claim 11,
wherein when setting communication control information, the communication control information setting step, in a case the recording medium is not inserted, makes a predetermined display prompting a user to insert a recording medium with communication control information recorded therein.

13. A communication control method according to claim 11,
wherein when setting communication control information, the communication control information setting step, in a case communication control information is not recorded on the recording medium, makes a predetermined display prompting a user to insert a second recording medium with communication control information recorded therein.

14. A communication control method according to claim 11,
wherein the communication control information setting step, in a case that a communication control error occurs as a result of communications based on communication control information read from the recording medium, makes a predetermined display prompting a user to insert a second recording medium with communication control information recorded therein.

15. A computer-readable recording medium, for storing an executable program, that when executed, causes a computer to carry out communication control of a communication apparatus, the communication apparatus being a TV receiver for communication through a predetermined network, the program comprising:
a configuring step of logically configuring a recording medium to have communication related information stored in a communication folder and to have communication unrelated information stored in additional folders, the communication folder further having wireless communication related information stored in a wireless communication folder;
a recording-medium reading step of reading communication control information being required for accessing a predetermined network from the recording medium capable of being inserted in and removed from the TV receiver;
a communication control information setting step of setting communication control information read from the recording medium to a predetermined communication control means; and
a communication control step of carrying out communications with a second apparatus through the predetermined network, according to the communication control information;
displaying a list of wireless network names when the TV receiver has previously accessed one or more wireless networks, each wireless network name associated with an SSID;
wherein the recording medium stores a communication process program that causes to display a menu requiring a user to select one communication information process from a read process, a write process, or a set change process,
wherein the read process reads out the communication control information from the recording medium, the write process writes the communication control information to the recording medium, and the set change process changes the communication control information that is currently used,
wherein the communication control step prepares a browse list of IP addresses of each apparatus constituting the predetermined network so that the IP address of each apparatus of the predetermined network is recognized by reading the browse list,
wherein the TV receiver includes a first antenna that receives television broadcast signals and a second antenna that radiates and receives a radio wave for wireless LAN communications,
wherein when the TV receiver has previously accessed the predetermined network and a DHCP is determined not to be within the predetermined network, the communication control means acquires an IP address and net mask of the predetermined network to be assigned by an AutoIP function, and
wherein after the TV receiver initiates a wireless access to the predetermined network, the communication control means acquires a net mask of the predetermined network, an IP address of other communication apparatuses in the predetermined network, and an IP address to be assigned if a DHCP is determined to be within the predetermined network.

* * * * *